(12) United States Patent
Nho

(10) Patent No.: US 9,137,848 B2
(45) Date of Patent: Sep. 15, 2015

(54) MOBILE TERMINAL, CONTROLLING METHOD THEREOF AND RECORDING MEDIUM THEREOF

(71) Applicant: LG ELECTRONICS INC., Seoul (KR)

(72) Inventor: Hyunwoo Nho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 237 days.

(21) Appl. No.: 13/736,770

(22) Filed: Jan. 8, 2013

(65) Prior Publication Data
US 2013/0196709 A1    Aug. 1, 2013

(30) Foreign Application Priority Data

Jan. 31, 2012  (KR) .................. 10-2012-0009466
Apr. 4, 2012   (KR) .................. 10-2012-0035148

(51) Int. Cl.
| | | |
|---|---|---|
| G06F 1/32 | (2006.01) | |
| H04M 1/00 | (2006.01) | |
| H04W 88/02 | (2009.01) | |

(52) U.S. Cl.
CPC ............. H04W 88/02 (2013.01); G06F 1/324 (2013.01); G06F 1/3287 (2013.01); Y02B 60/1217 (2013.01); Y02B 60/1282 (2013.01)

(58) Field of Classification Search
CPC ... G06F 1/3293; G06F 1/3287; G06F 1/3243; H04M 1/00
USPC .............................................. 455/550.1, 574
See application file for complete search history.

(56) References Cited

U.S. PATENT DOCUMENTS

| | | | |
|---|---|---|---|
| 2011/0213947 A1* | 9/2011 | Mathieson et al. | 712/16 |
| 2012/0072746 A1* | 3/2012 | Sotomayor | 713/320 |
| 2013/0013911 A1* | 1/2013 | Gustafsson | 713/100 |
| 2013/0073875 A1* | 3/2013 | Anderson et al. | 713/300 |
| 2013/0159748 A1* | 6/2013 | Judd | 713/322 |

FOREIGN PATENT DOCUMENTS

| | | |
|---|---|---|
| CN | 1877491 | 12/2006 |
| CN | 101111814 | 1/2008 |
| WO | 2010/085512 | 7/2010 |

OTHER PUBLICATIONS

The State Intellectual Property Office of the People's Republic of China Application Serial No. 201310038782.3, Office Action dated Jan. 26, 2015, 8 pages.

* cited by examiner

*Primary Examiner* — Blane J Jackson
(74) *Attorney, Agent, or Firm* — Lee, Hong, Degerman, Kang & Waimey

(57) ABSTRACT

A mobile terminal and controlling method thereof are disclosed, by which an operable time of the mobile terminal can be increased in a manner of raising CPU power efficiency of the mobile terminal. The present invention includes a plurality of cores,
a multicore adjuster configured to obtain a frequency of an active core of the plurality of cores, determine whether the obtained frequency exceeds a first threshold value for N consecutive times, wherein N is a positive integer, and activate at least one inactive core of the plurality of cores when the obtained frequency exceeds the first threshold value for N consecutive times, and a frequency adjuster configured to determine a workload of the active core, and adjust the obtained frequency of the active core according to the determined workload.

18 Claims, 24 Drawing Sheets

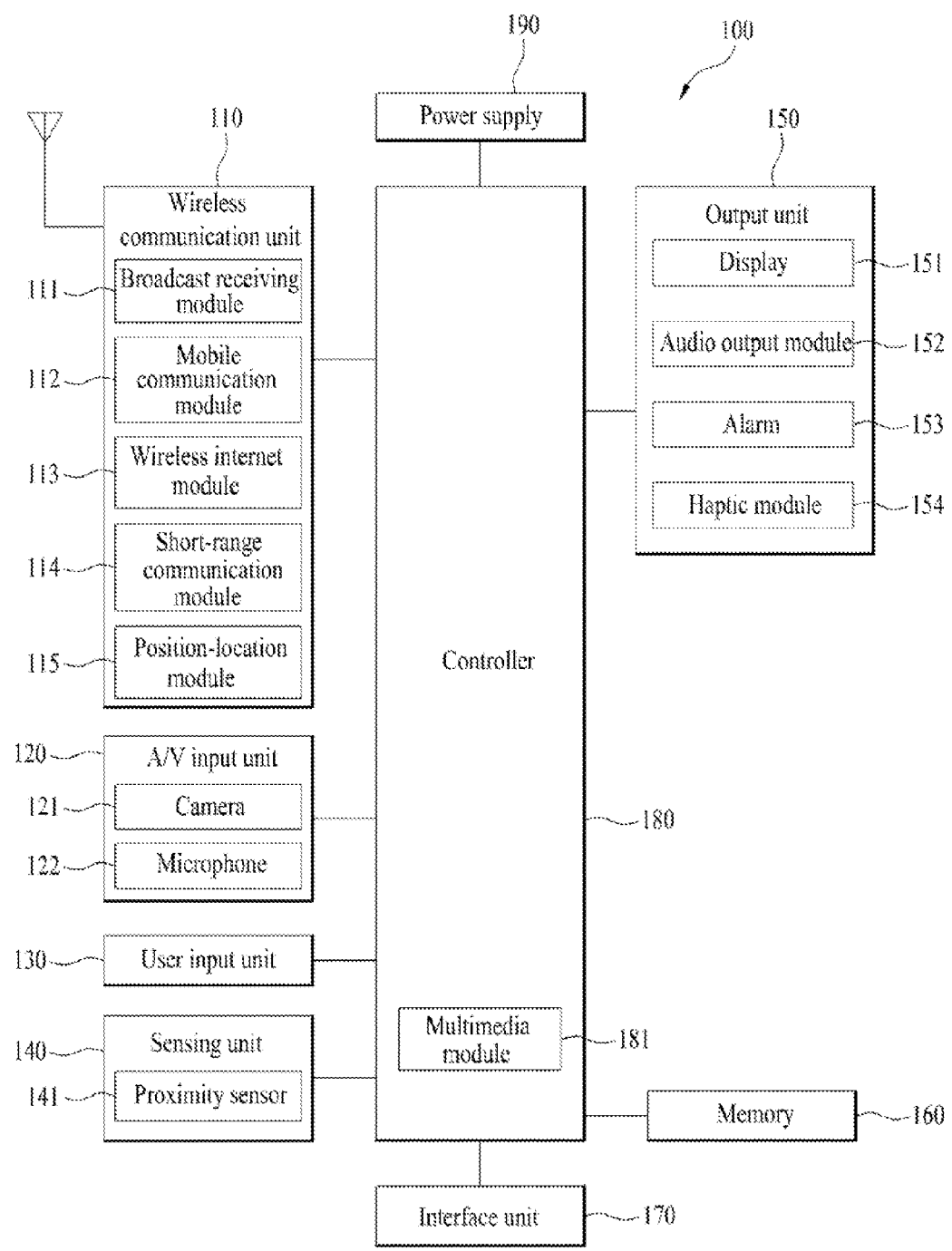

FIG. 5
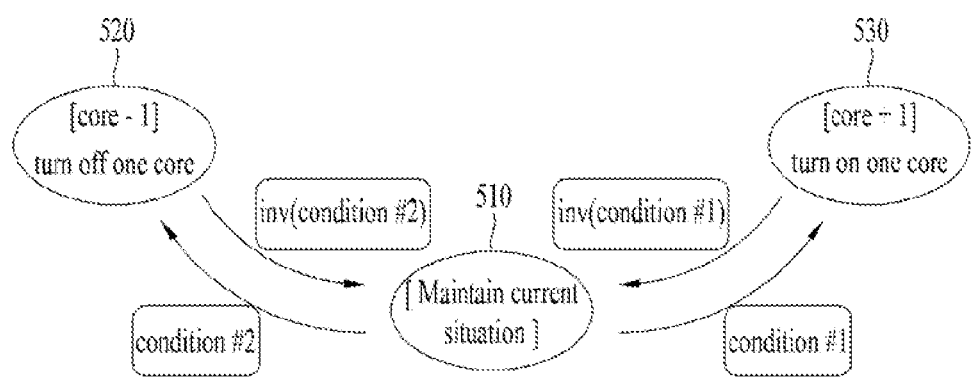
(a)
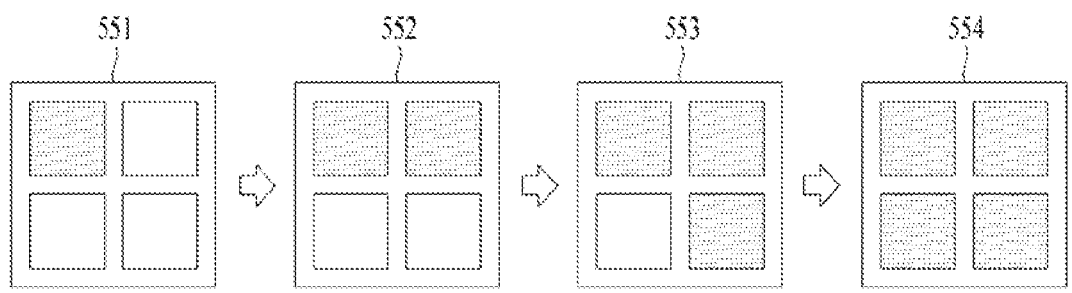
(b)

(b)

MOBILE TERMINAL, CONTROLLING METHOD THEREOF AND RECORDING MEDIUM THEREOF

CROSS-REFERENCE TO RELATED APPLICATIONS

Pursuant to 35 U.S.C. §119(a), this application claims the benefit of earlier filing date and right of priority to Korean Patent Application No. 10-2012-0009466, filed on Jan. 31, 2012, and Korean Patent Application No. 10-2012-0035148, filed on Apr. 4, 2012, the contents of which are all hereby incorporated by reference herein in their entirety.

BACKGROUND

1. Field

The present invention relates to a mobile terminal, and more particularly, to a mobile terminal, controlling method thereof and recording medium thereof. Although the present invention is suitable for a wide scope of applications, it is particularly suitable for implementing a use of the terminal in further consideration of user's convenience.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

A basic role of CPU, which is one of the major components of a mobile terminal, is to perform such a work as operation and computation. For instance, if a user inputs a command of '0+1', the CPU receives the command input, performs operation thereon, and then displays a result of '1'. Moreover, the CPU is capable of data processing to display various kinds of data of document, picture, music, video and the like.

Conventionally, in order to raise performance of CPU, a CPU clock rate is normally raised. Recently, CPU performance is normally raised in a manner of increasing the number of CPU cores. Regarding computer CPU, a core is an essential part of a processing circuit built in the CPU. If the CPU includes a prescribed number of cores, the CPU's performance can become similar to performance that can be provided by a prescribed number of CPUs. For instance, since a dual core CPU is able to finish a work supposed to be processed twice by a single core CPU, its processing performance can become higher than that of the single core CPU.

The advent of such a dual core CPU as Pentium D by Intel, Athlon 64 X2 by AMD and the like has led to the beginning of multi-core CPU and a quad core market of CPU having 4 cores is getting popular. Many ongoing efforts are made to research and develop a hexa-core CPU having 6 cores to an octet core CPU having 8 cores. Hence, it is expected that the number of CPU cores will increase.

A multi-core CPU used to be adopted by a fixed-type computing device is expanding its applicable fields. Regarding smart phones, for example, various dual core smart phones including Optimus X2 by LG Electronics, Galaxy 2 by Samsung, Vega Racer by Pantech, iPhone 4s by Apple, Sensation by HTC and the like have been released since January, 2011. And, Quad core smart phones will be released by LG, HTC, Hauwei and the like in MWC (Mobile World Congress) 2012.

However, if the number of CPU cores of a mobile terminal is increases, it may remarkably enhance user's convenience by increasing a processing speed of the mobile terminal but cause a considerable problem unlike a fixed-type terminal. In particular, since a power keeps being supplied to the fixed-type terminal continuously, the fixed-type terminal is continuously usable unless such an accident as blackout and the like. On the contrary, since a mobile terminal is operable with a capacity-limited battery, a remaining power level of the battery needs to be taken into consideration all the time. In particular, regarding the mobile terminal, the more CPU cores are adopted, the larger the power consumption becomes. And, it may eventually cause a problem that an operable time of the mobile terminal is reduced.

SUMMARY

Accordingly, embodiments of the present invention are directed to a mobile terminal, controlling method thereof and recording medium thereof that substantially obviate one or more problems due to limitations and disadvantages of the related art.

One object of the present invention is to provide a mobile terminal, controlling method thereof and recording medium thereof, by which an operable time of the mobile terminal can be increased in a manner of raising CPU power efficiency of the mobile terminal.

Another object of the present invention is to provide a mobile terminal, controlling method thereof and recording medium thereof, by which an operable time of the mobile terminal can be increased in a manner of reducing power consumed for activating cores by activating a prescribed number of cores appropriate for a task requirement of the mobile terminal.

A further object of the present invention is to provide a mobile terminal, controlling method thereof and recording medium thereof, by which an operable time of the mobile terminal can be increased with reduced power consumption in a manner of changing setting values of the mobile terminal in response to a remaining power level of a battery.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a plurality of cores, a multicore adjuster configured to obtain a frequency of an active core of the plurality of cores, determine whether the obtained frequency exceeds a first threshold value for N consecutive times, wherein N is a positive integer, and activate at least one inactive core of the plurality of cores when the obtained frequency exceeds the first threshold value for N consecutive times, and a frequency adjuster configured to determine a workload of the active core, and adjust the obtained frequency of the active core according to the determined workload.

In another aspect of the present invention, a method of controlling a mobile terminal according to the present invention may comprise obtaining a frequency of an active core of a plurality of cores in the mobile terminal, determining whether the obtained frequency exceeds a first threshold value for N consecutive times, wherein N is a positive integer, and activating at least one inactive core of the plurality of cores when the obtained frequency exceeds the first threshold value for N consecutive times.

In a further aspect of the present invention, a computer-readable recording medium, in which a mobile controlling method is recorded, according to the present invention may comprise a first command configured to obtain a frequency of an active core of a plurality of cores in the mobile terminal, a second command configured to determine whether the obtained frequency exceeds a first threshold value for N consecutive times, wherein N is a positive integer, and a third command configured to activate at least one inactive core of the plurality of cores when the obtained frequency exceeds the first threshold value for N consecutive times.

Effects obtainable from the present invention may be non-limited by the above mentioned effect. And, other unmentioned effects can be clearly understood from the following description by those having ordinary skill in the technical field to which the present invention pertains. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 1 is a block diagram of a mobile terminal according to one embodiment of the present invention;

FIG. 5 is a diagram of core activation algorithm applied to a current multicore adjuster;

DETAILED DESCRIPTION

Figure 2A:
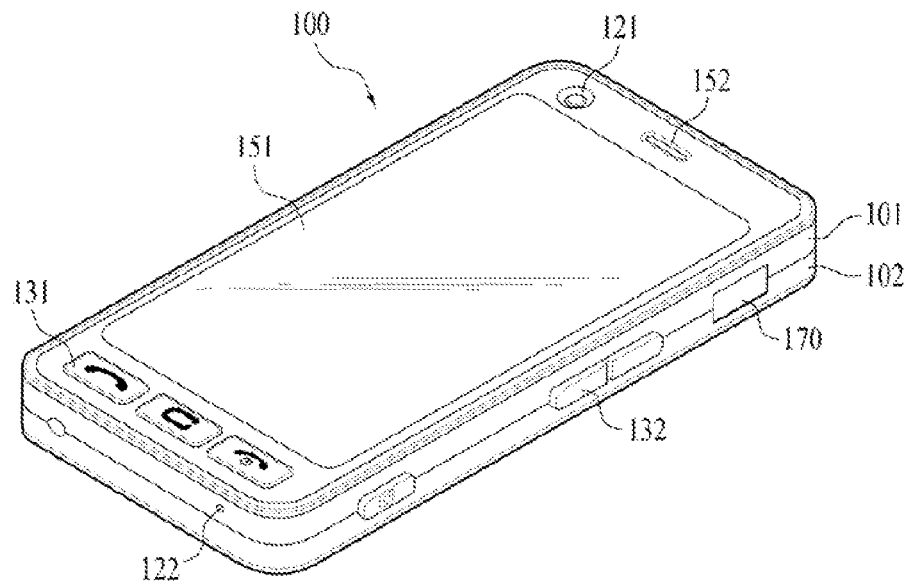
FIG. 2A is a front perspective diagram of a mobile terminal according to one embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 180 and the like can be provided to the terminal body, and more particularly, to the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display unit 151 or the like can be inputted to the second manipulating unit 132.

Figure 2B:
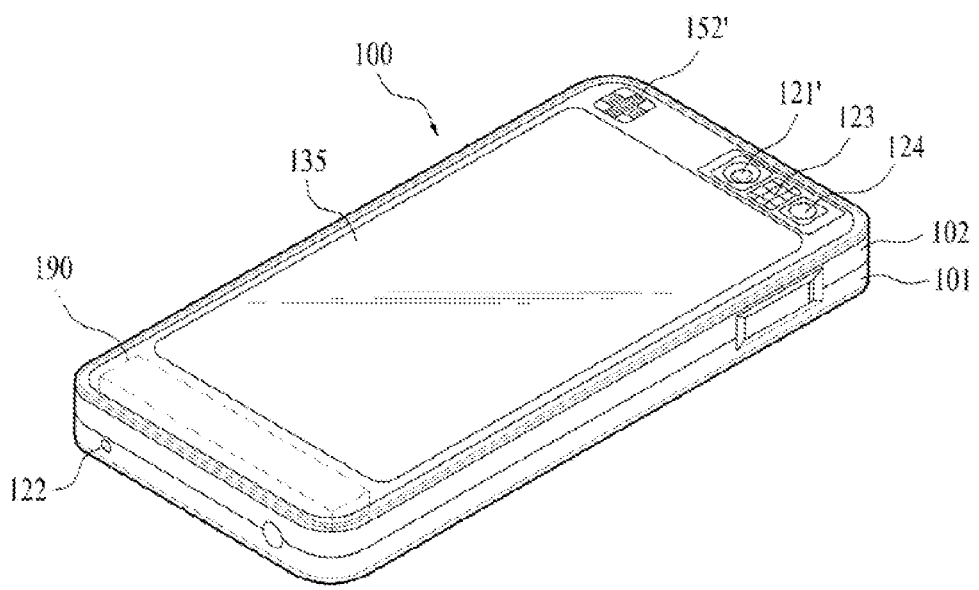
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit 151. In this case, if the display unit 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

In the following description, embodiments related to a controlling method implemented in the above-configured mobile terminal are explained with reference to the accompanying drawings.

For clarity and convenience of the following description, assume that the mobile terminal 100 mentioned in the following description may include at least one of the components shown in FIG. 1. In particular, the mobile terminal 100 according to the present invention may include the memory 160 and the controller 180 among the components shown in FIG. 1.

A central processing unit (hereinafter abbreviated CPU) included in the controller plays a role in handling or processing tasks occurring in the mobile terminal. In particular, the CPU plays a role in interpreting a command inputted by a user, analyzing the interpreted command, and then outputting a corresponding result. A configuration of such a part as a CPU, in which an operating device, a decrypting device, a control device and the like are integrated, is called a microprocessor. Frequently, the CPU and the microprocessor are interchangeably used as the same meaning. In this specification, assume that each of the CPU and the microprocessor has the same meaning.

Various kinds of frequency profiles may be applicable to a CPU or each core that constitutes the CPU. This is described in detail with reference to FIG. 3 as follows.

Figure 3:
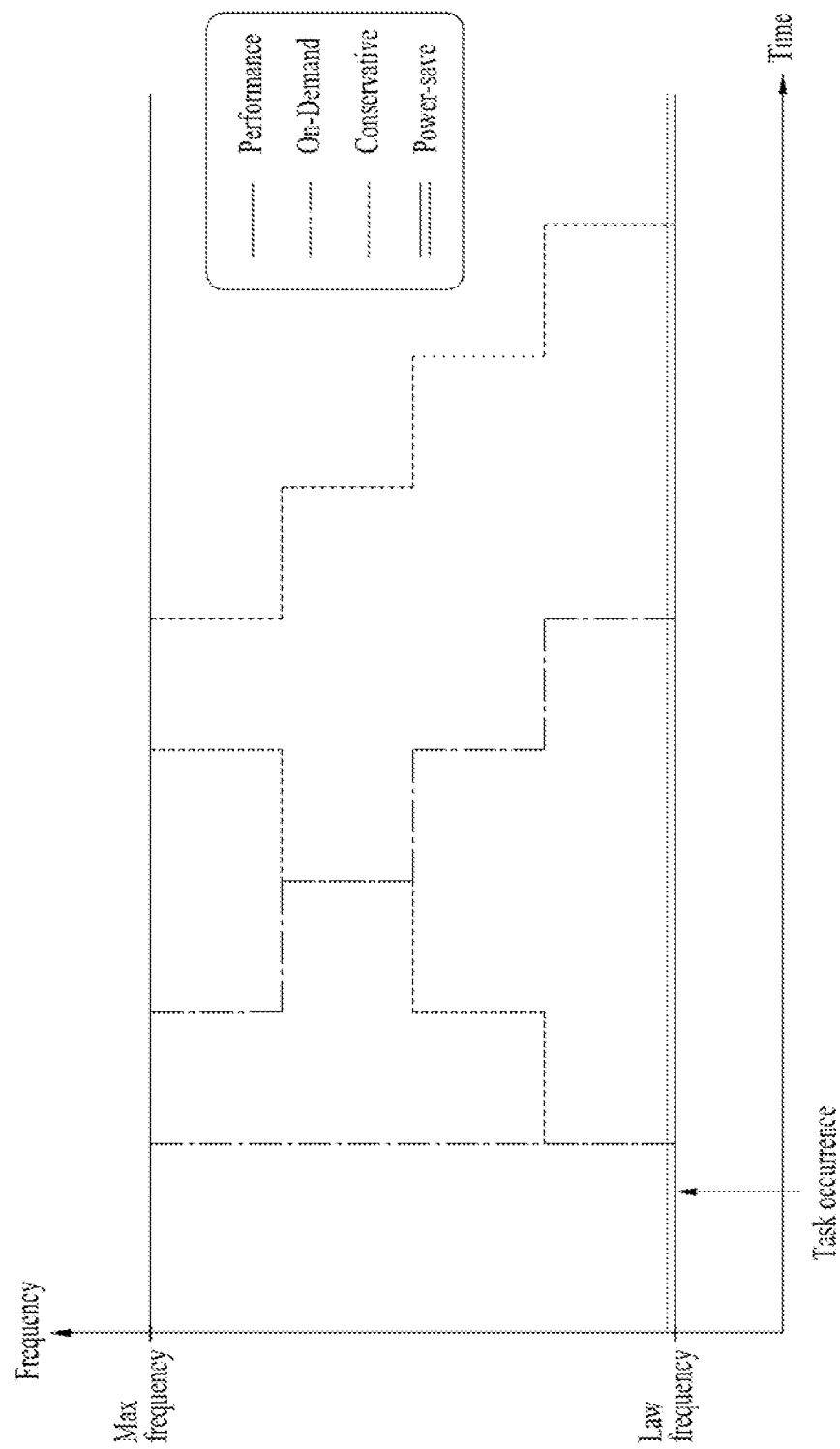
FIG. 3 is a graph of a frequency profile applicable to active cores in a mobile terminal including a plurality of cores.

FIG. 3 is a graph of a frequency profile applicable to active cores in a mobile terminal including a plurality of cores.

Referring to FIG. 3, frequency profiles applicable to cores in active state may include a performance profile, an on-demand profile, a conservative profile and a power-save profile.

The performance profile operates a core at a maximum frequency all the time irrespective of a work-load of the core. Since the core is always operated at the maximum frequency, the work processing capability can be maintained on a maximum level all the time. Yet, since the core consumes a considerable power, it is disadvantageous in that the battery efficiency is poor.

Contrary to the performance profile, the power-save profile operates a core at a minimum frequency all the time irrespective of a work-load. Since the core is operated at the minimum frequency all the time, the work processing capability is low. Yet, it is advantageous in that the power consumed by the core can be maintained on a minimum level.

The on-demand profile has a policy of decreasing a frequency gradually in accordance with a work-load after setting a core to be operated at a maximum frequency in response to an occurrence of a task supposed to be processed by the core.

The conservative profile is a method of lowering a frequency gradually if a work-load is reduced after raising a frequency of a core in response to an occurrence of a task supposed to be processed by the core.

Regarding the relation between a battery efficiency and performance of a mobile terminal, the performance profile may have a problem in failing to consider the battery efficiency, while the power-save profile may have a problem in failing to secure the performance of the mobile terminal. Hence, the on-demand profile and the conservative profile may be regarded as proposing compromise plans to solve the problems caused by the performance profile and the power-save profile.

Yet, according to the conservative profile, since a frequency of a core is gradually raised, it may cause a problem that a work processing time of the conservative profile is relatively longer than that of the on-demand profile. And, it may also cause a problem that the conservative profile is not appropriate for a task (e.g., a screen should be shifted in response to a scroll command of a touch input) of outputting a result in a short time. Since the on-demand profile actives a core at a frequency higher than that of the conservative profile, it causes a problem that the power consumption of the on-demand profile is larger than that of the conservative profile. Yet, in aspect of maintaining the performance of the mobile terminal, the on-demand profile is applied more universally than the conservative profile.

In case that the on-demand profile is applied to every core, it causes a problem that the number of active cores may increase unnecessarily. This problem shall be described in detail with reference to FIG. 4 and FIG. 5 as follows.

Figure 4:
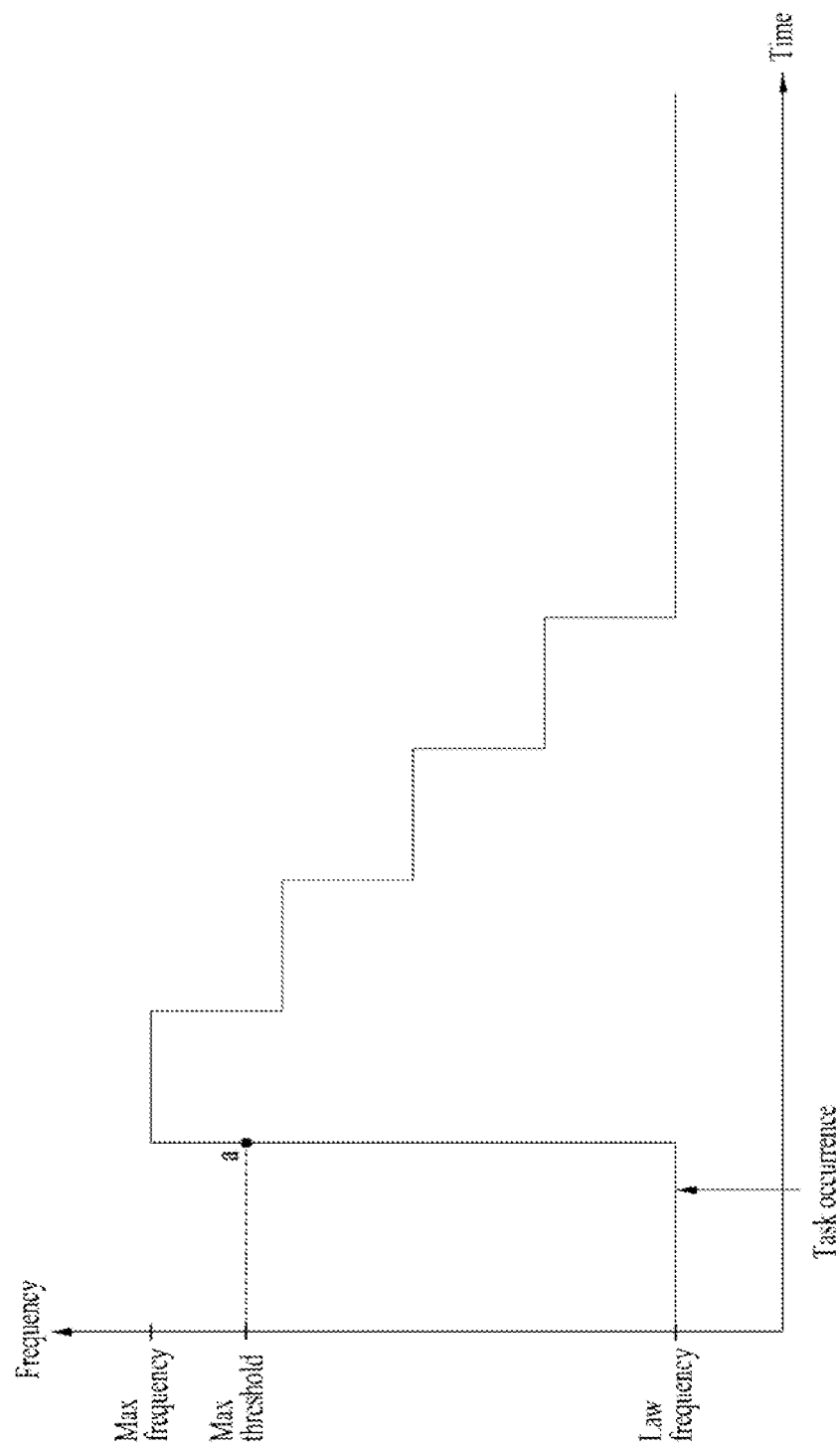
FIG. 4 is a graph of an on-demand profile to describe correlation between a frequency variation and a maximum threshold of a multicore adjuster.

FIG. 4 is a graph of an on-demand profile to describe correlation between a frequency variation and a maximum threshold of a multicore adjuster. Prior to the description with reference to FIG. 4, core activation algorithm applied to a current multicore adjuster shall be described in detail as follows.

FIG. 5 is a diagram of core activation algorithm applied to a current multicore adjuster.

First of all, FIG. 5 (*a*) shows core activation algorithm applied to a current multicore adjuster. Referring to FIG. 5 (*a*), a current multicore adjuster uses such algorithm as incrementing a core operated in response to a work-load of an active core one by one. In particular, by comparing a frequency and maximum/minimum threshold of the active core to each other, whether to activate a new core or to deactivate the active core is determined. In particular, if a first condition that a frequency of at least one of a plurality of active cores exceeds a maximum threshold is met in a current state [510], a controller may be able to activate another core in addition [520]. On the other hand, if a second condition that a frequency of at least one of a plurality of active cores is smaller than a minimum threshold is met in a current state [510], a controller may be able to control the corresponding core to be deactivated [530].

Meanwhile, if any one of the active cores fails to meet the first/second condition in the current state [510], the activation/deactivation is not additionally performed but the operation can be performed in a manner of maintaining the number of the currently active cores.

FIG. 5 (*b*) shows one example of a case that the algorithm shown in FIG. 5 (*a*) is actually applied to a quad-core. In an early stage shown in FIG. 5 (*b*), assume a case 551 that a first core of the quad-core is activated alone. In doing so, if the first core is active at a frequency higher than 90% (i.e., maximum threshold) of a maximum frequency [first condition], the controller 180 may be able to control a prescribed one (e.g., a second core) of the inactive cores to be activated together with the first core.

While both of the first and second cores are active together, if a frequency of the first or second core exceeds the maximum threshold [first condition], the controller 180 may be able to control at least one (e.g., a third core) of the inactive cores to maintain an active state together with the first and second cores [553].

Moreover, in case that the first to third cores are active together [553], if a frequency of one of the first to third cores is greater than the maximum threshold in comparison with the maximum frequency [first condition], the controller 180 may be able to control a last core (i.e., a forth core) to be activated as well [554].

On the other hand, if a frequency of a currently active core lies in a threshold range in comparison with the maximum frequency [second condition], the controller 180 may be able to control one of the cores to be deactivated. For instance, if a frequency of one of the currently active 4 cores is smaller than 50% (i.e., a minimum threshold) of the maximum frequency [second condition], the controller 180 may be able to control the corresponding core to be deactivated. In particular, the controller 180 may be able to determine whether to increase or decrease the number of the activated cores depending on a work-load of each of the cores.

Based on the algorithm shown in FIG. 5, referring to FIG. 4, it can be observed that the first condition may be met indiscreetly in case of the on-demand profile. In particular, if a task supposed to be processed by a core occurs in the on-demand profile, since a frequency of the core is raised to a maximum frequency to exceed a maximum threshold all the time, activation of an inactive core is triggered irrespective of a work-load to be actually handled. For instance, despite a work that can be sufficiently handled by a single core, it may cause a problem that at least 2 cores are activated. For another instance, despite a work that can be sufficiently handled by 2 cores, it may cause a problem that at least 3 cores are activated. Thus, despite a task that can be handled using less cores, more cores are unnecessarily activated. And, an unnecessary power is consumed to activate the redundant cores.

Of course, a time taken to process a task amounting to a small work-load may be reduced using multiple cores. Yet, since the reduced extent of the small work-load task is insignificant, a user may barely experience performance enhancement. For instance, when a text based program like a memo pad is activated, even if the program, which can be processed in 0.5 second using a single core, is processed in 0.2 second using 4 cores, an improved speed sensed by a user is only 0.3 second.

In case of a program, which is relatively heavier than a memo pad, in need of image processing like a gallery, if all 4 cores are activated despite that the program can be sufficiently processed using 2 cores only, it may cause a problem of consuming an unnecessary power in spite that an effect of an improved speed sensed by a user is insignificant.

Therefore, if a performance enhancement sensed by a user is not considerable, it may be able to consider extending a usable time of a mobile terminal in a manner of decreasing the number of active cores and the power consumption.

Figure 6:
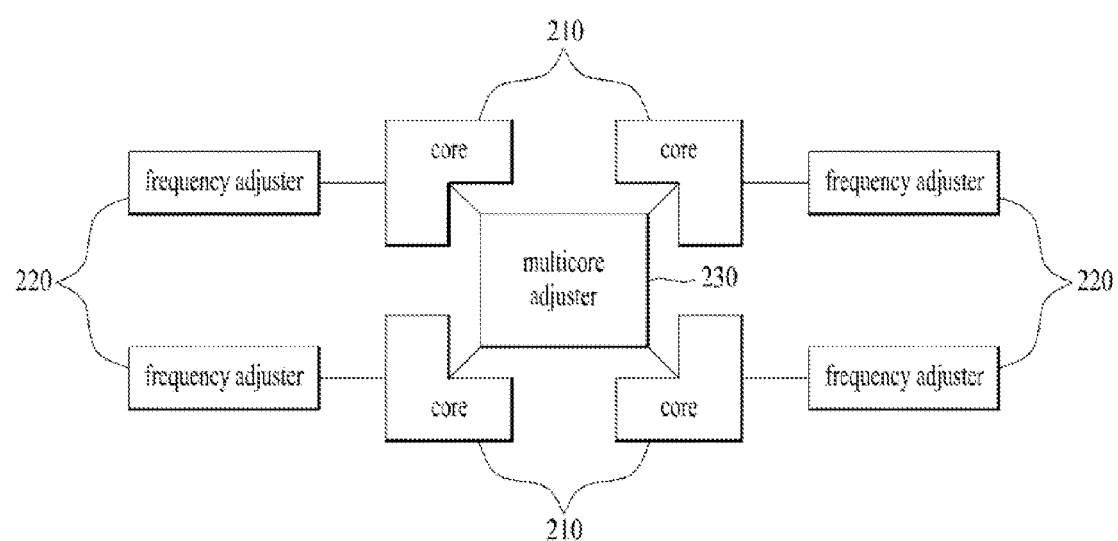
FIG. 6 is a block diagram of a controller according to one embodiment of the present invention.

Regarding a task having a light work-load, referring to FIG. 6, the controller of the present invention, which is able to control cores not to be activated unnecessarily, may include a multicore CPU. In particular, the multicore CPU may include a plurality of cores 210, a frequency adjuster 220 and a multicore adjuster 230. The frequency adjuster 220 shown in FIG.

6 is connected to a plurality of the cores 210 and plays a role in adjusting a frequency of each of the cores and a frequency profile thereof. And, the multicore adjuster 230 is configured to control activation/deactivation of each of the cores based on the frequency of the corresponding core.

For clarity of the following description, assume that the CPU of the present invention may include a quad-core having 4 cores, by which the present invention may be non-limited. For instance, it is a matter of course that the present invention is applicable to such a CPU as a processor having at least two cores (e.g., a processor having 2 cores, a processor having 3 cores, a processor having 6 cores, a processor having 8 cores, etc.). Moreover, for clarity, 4 cores may be named first to fourth cores in order of activation, respectively.

In the following description, an operating flow of a mobile terminal according to the present invention is explained in detail with reference to the accompanying drawings.

Figure 7:
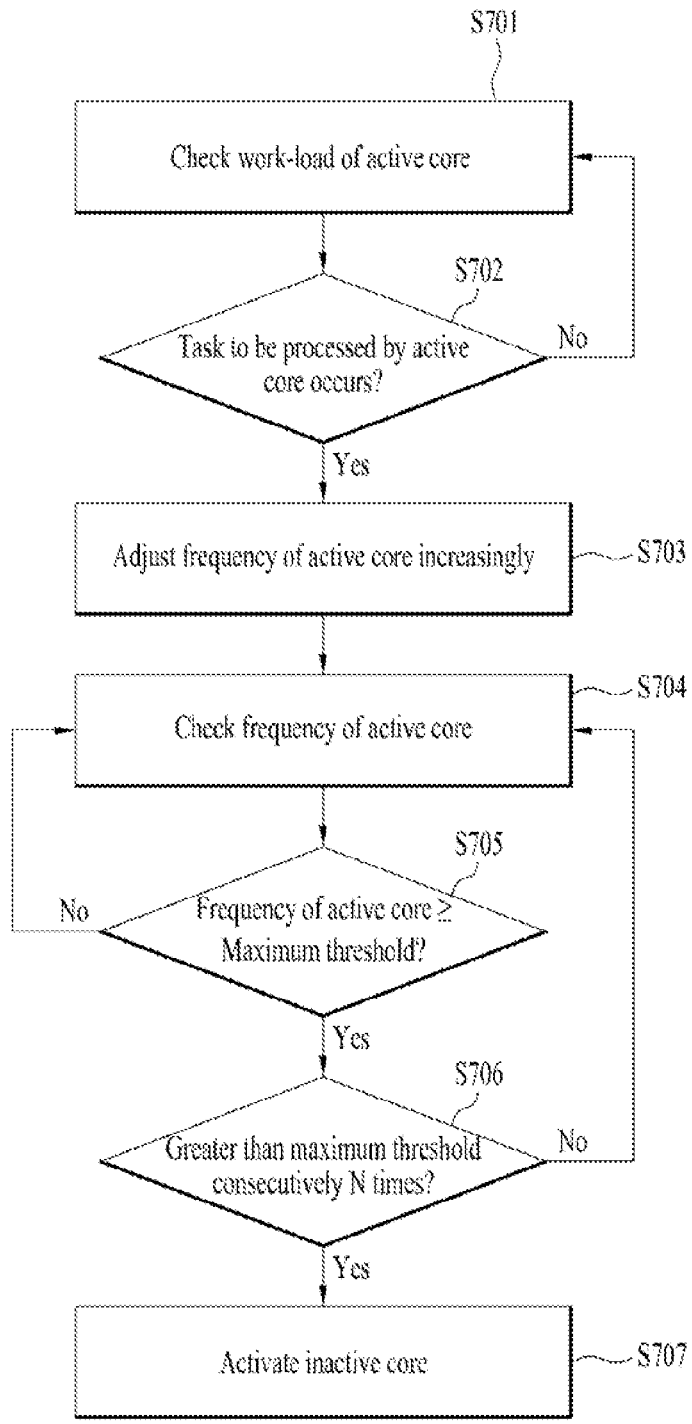
FIG. 7 is a flowchart of operation of a multicore adjuster according to one embodiment of the present invention.
Figure 8:
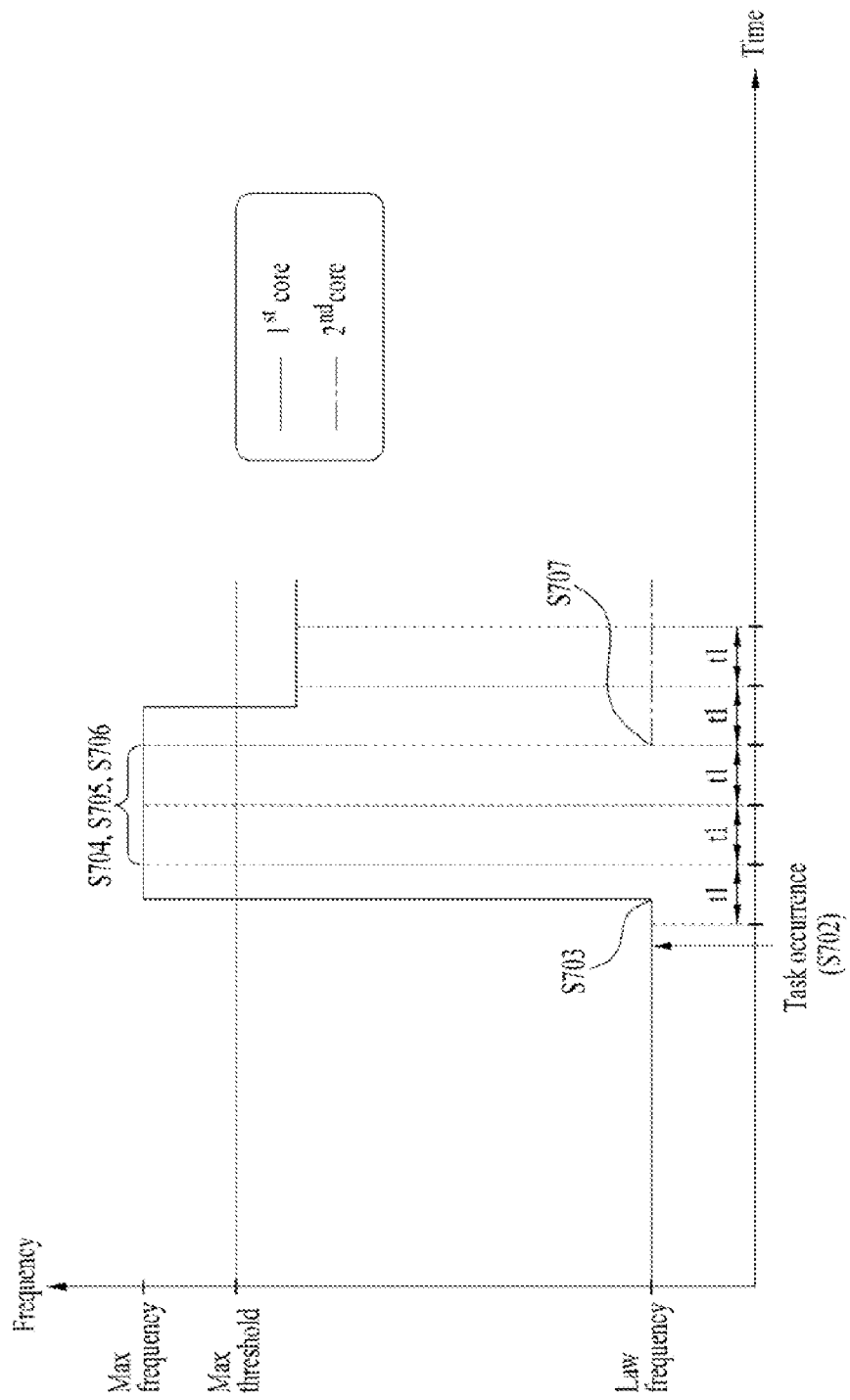
FIG. 8 is a graph for one example of frequencies of cores corresponding to the respective steps shown in FIG. 7.

FIG. 7 is a flowchart of operation of a multicore adjuster 230 according to one embodiment of the present invention. FIG. 8 is a graph for one example of frequencies of cores corresponding to the respective steps shown in FIG. 7. In FIG. 7 and FIG. 8, assume that one of the 4 cores is active only in the early stage. In FIG. 8, assume that an on-demand profile is applied to the active core. In FIG. 8, 't1' indicates a period for the multicore adjuster 230 to search for a frequency of the active core.

Referring to FIG. 7 and FIG. 8, the multicore adjuster 230 checks a work-load of an active core periodically [S701]. If a task occurs in the active core [S702], the frequency adjuster 220 may be able to control a frequency of the active core to be raised [S703]. The multicore adjuster 230 checks the frequency of the active core [S704] and then determines whether the checked frequency of the corresponding core is higher than a maximum threshold determined by the multicore adjuster 230 [S705]. In doing so, in case that the on-demand profile is applied to the active core (e.g., the first core), the frequency of the first core may exceed the maximum threshold determined by the multicore adjuster 230 at one try. On the other hand, if the conservative profile is applied to the first core, the frequency of the first core may not exceed the maximum threshold determined by the multicore adjuster 230 at one try. In this case, if a work-load of the first core is considerable, the frequency of the first core is raised increasingly to exceed the maximum threshold determined by the multicore adjuster 230.

As a result of the check, if the frequency of the first core is higher than the maximum threshold determined by the multicore adjuster 230, the multicore adjuster 230 evaluates whether the frequency of the corresponding core is higher than the maximum threshold N time consecutively (i.e., during a first prescribed time) [S706]. Since a previously measured frequency is lower than the maximum threshold despite that the frequency of the first core is higher than the maximum threshold, if each of the values measured N times is not always higher than the maximum threshold, a frequency value of a next period may be set to be obtained without activating inactive core(s). On the other hand, if each of the frequency values measured N times on the active core is higher than the maximum threshold, the multicore adjuster 230 recognizes that a work-load supposed to be handled by the core is considerable and may be then able to control the second core to be activated [S707].

In particular, even if a frequency of a core exceeds a maximum threshold, the multicore adjuster 230 of the present invention may control the inactive core to be directly activated. Instead, the multicore adjuster 230 checks a frequency of an active core periodically. Only if the frequency of the active core exceeds a maximum threshold N times consecutively (i.e., for first prescribed time), the multicore adjuster 230 may be able to control at least one of inactive cores to be active. In doing so, 'N times consecutively' is a concept of time and may be construed as the frequency of the active core exceeds the maximum threshold for the first prescribed time.

Through this, even if the on-demand profile is applied to all the cores, it may be able to prevent the second core, the third core and the fourth core from being indiscreetly active after the first core. In particular, as a task supposed to be handled by the first core is generated, unless the corresponding frequency may exceed the maximum threshold N times consecutively the second core may not be activated.

In the example shown in FIG. 7, the steps S704 to S706 are performed after completion of the step S703, by which the present invention may be non-limited. For instance, the steps S704 to S707 may be performed in the course of performing the steps S701 to S703.

In the example shown in FIG. 8, only if the frequency of the first core exceeds the maximum threshold 3 times consecutively, the multicore adjuster 230 actives the second core. Yet, it may be unnecessary to set the N to 3. In FIG. 7, the N is a natural number including 1. And, the N is may be changeable in response to the number of the active cores.

For instance, after the first core has been activated, if the N is set to 2 in case of attempting to activate the second core, the N may be set to 3 to activate the third core after the second core has been activated. Moreover, after the first core, the second core and the third core have been activated, the N may be set to 4 in case of attempting to activate the fourth core. Thus, if the N value is incremented in proportion to the number of the active cores, it may prevent more cores from being activated unnecessarily after activation of a sufficient number of cores in a manner of making a core activating condition more complicated. On the other hand, it may be able to set the N value to be gradually decremented. In doing so, if a harsh condition for activating another core in a state that a single core is activated only is made, it may be able to set a plurality of the cores not to be usable unless a sufficiently heavy work is put on the single core.

Moreover, the N may be adjustable in accordance with a remaining power level of the power supply unit. A process for adjusting the N value in accordance with the remaining power level of the power supply unit is described in detail with reference to FIG. 9 as follows.

Figure 9:
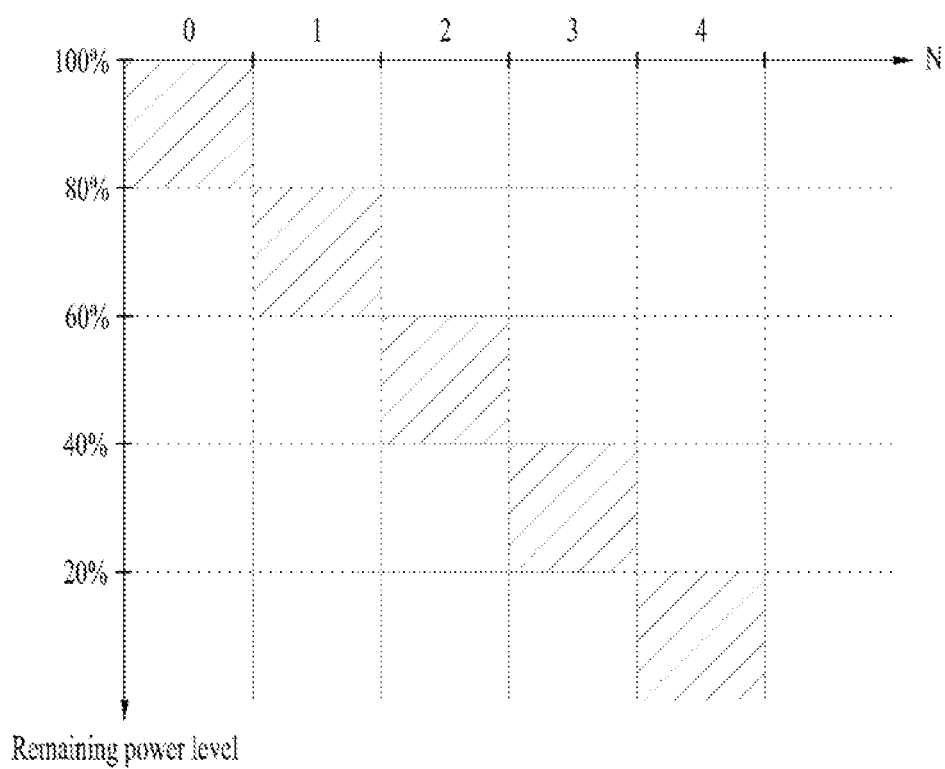
FIG. 9 is a graph for one example to describe a process for adjusting a value N in response to a remaining power level of a power supply unit.

FIG. 9 is a graph for one example to describe a process for adjusting a value N in response to a remaining power level of a power supply unit. In FIG. 9, X-axis and Y-axis may indicate an N value and a remaining power level of a power supply unit, respectively.

Referring to FIG. 9, the N value applied to the multicore adjuster 230 may be adjustable in accordance with the remaining power level of the power supply unit. In the example shown in FIG. 9, the lower the remaining power level of the power supply unit gets, the greater the N value becomes step by step. If so, it may be able to prevent indiscreet core activation. Hence, it may be able to save a power required for activating a core. In this case, it is a matter of course that the N value may increase in proportion to the number of active cores. In the example shown in FIG. 9, the N value is incremented by 1 each time a battery level is reduced by 20%, which may be applicable in different ways.

Moreover, the multicore adjuster 230 according to the present invention may control the maximum number of cores, which can be activated in accordance with a remaining battery power level, to be limited.

Figure 10:
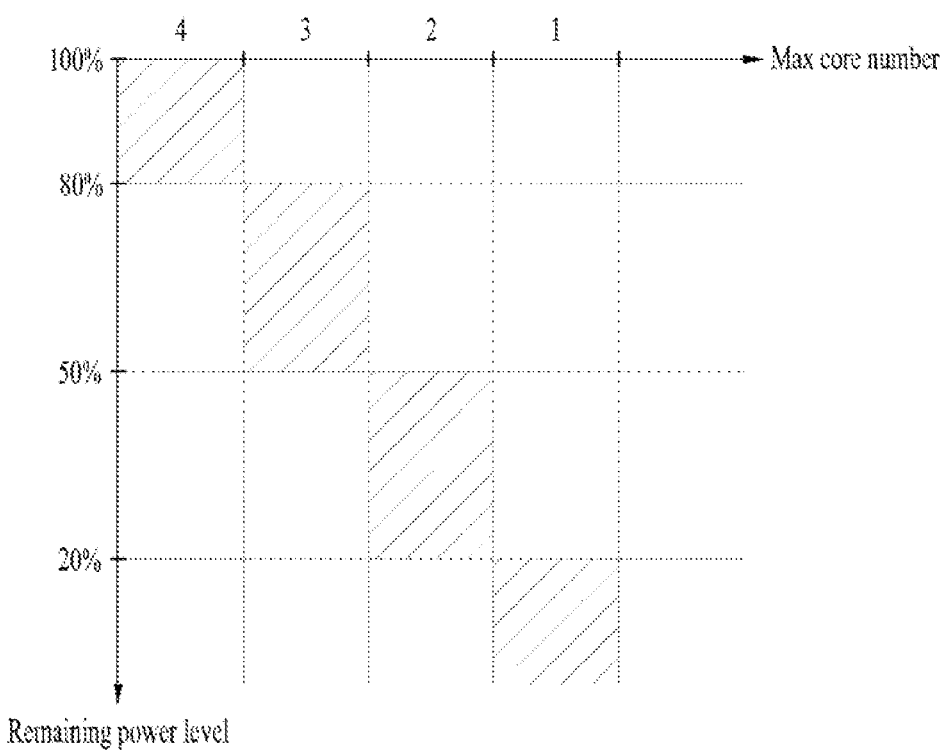
FIG. 10 is a graph for one example to describe a process for restricting a maximum number of cores activated in response to a remaining power level of a power supply unit.

FIG. 10 is a graph for one example to describe a process for restricting a maximum number of cores activated in response to a remaining power level of a power supply unit.

Referring to FIG. 10, in case that a remaining power level is equal to or higher than 80%, all 4 cores are set to be available for activation. If the remaining power level is in a range between 50% and 80%, maximum 3 cores are set to be available for activation. If the remaining power level is in a range between 20% and 50%, maximum 2 cores are set to be available for activation. If the remaining power level is lower than 20%, a single core can be available for activation only. This is to increase a usable time of a mobile terminal by reducing a power consumed for core activation and a power supplied to the core in a manner of limiting the maximum number of the cores that can be activated.

The example shown in FIG. 9 and the example shown in FIG. 10 may not be separately implemented. For instance, the examples shown in FIG. 9 and FIG. 10 may be implemented together by being combined with each other. The example of implementing the combination of the examples shown in FIG. 9 and FIG. 10 is described in detail with reference to FIG. 11 as follows.

Figure 11:
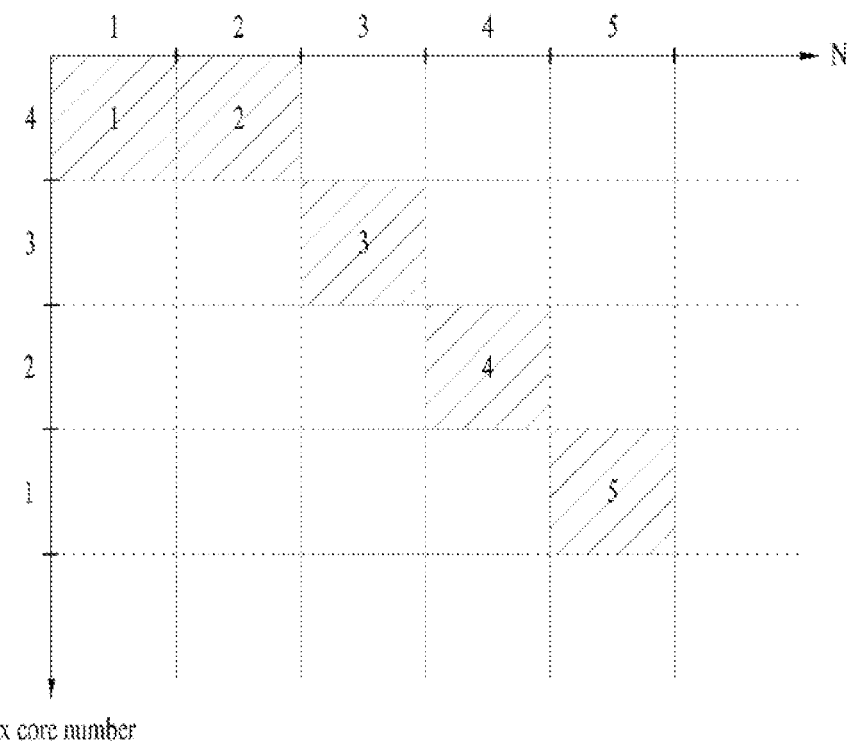
FIG. 11 is a graph for one example to describe a process for changing a maximum number of cores activated in response to a remaining power level of a power supply unit and a value N determined by a multicore adjuster.

FIG. 11 is a graph for one example to describe a process for changing a maximum number of cores activated in response to a remaining power level of the power supply unit and a value N determined by the multicore adjuster. In FIG. 11, Y-axis may indicate the maximum number of cores that can be activated. And, X-axis may indicate an N value of the multicore adjuster 230. The numerals 1 to 5 represented on the graph indicate the remaining power levels of the power supply unit shown in FIG. 10. For instance, if the numeral gets closer to 1, the remaining power level may be understood as becoming higher. If the numeral gets closer to 5, the remaining power level may be understood as becoming lower.

Referring to FIG. 11, if the remaining power level of the power supply unit gets lower, the multicore adjuster 230 may be able to set the N value to a greater value by decreasing the maximum number of the cores that can be activated. By limiting the maximum number of the cores that can be available for activation, the power consumed for core activation can be saved. By preventing the cores from being indiscreetly activated in a manner of increasing the N value, the power consumption can be reduced.

In the examples shown in FIG. 6 and FIG. 7, the multicore adjuster 230 activates the inactive cores one by one in response to the frequency of the active core. Yet, it is not mandatory to activate a prescribed one of the inactive cores. For instance, two cores can be activated at the same time. For another instance, at least two cores can be simultaneously activated.

In the examples shown in FIG. 9 and FIG. 11, if N is set to 1, an inactive core enters an active state as soon as a frequency of an active core exceeds a maximum threshold. In doing so, unnecessary power consumption may occur due to the indiscreet core activation. Thus, in order to solve the unnecessary power consumption problem that may occur in case that N is set to 1, the frequency adjuster 220 may be able to adjust a frequency profile applied to cores.

If N is set to 1, a method for the frequency adjuster 220 to reduce an unnecessary power consumption is described in detail with reference to the accompanying drawings as follows. The examples shown in the following accompanying drawings may result in more significant effects if N is set to 1. And, it is a matter of course that the examples shown in the following accompanying drawings may be applicable to a case that N is greater than 1.

Figure 12:
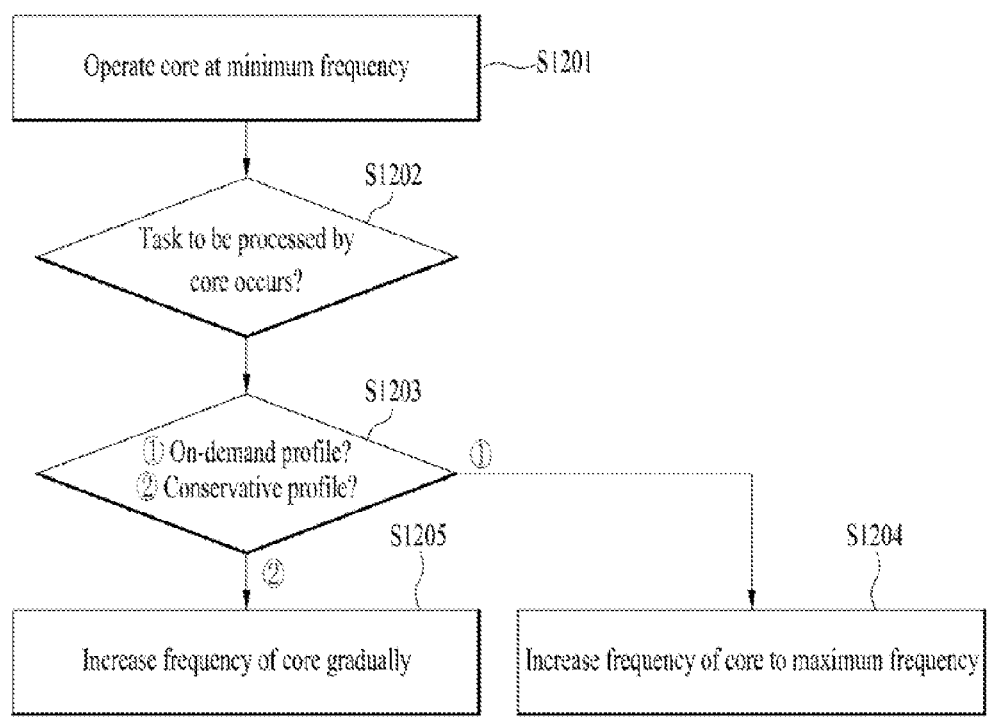
FIG. 12 is a flowchart for operation of a frequency adjuster according to the present invention.
Figure 13:
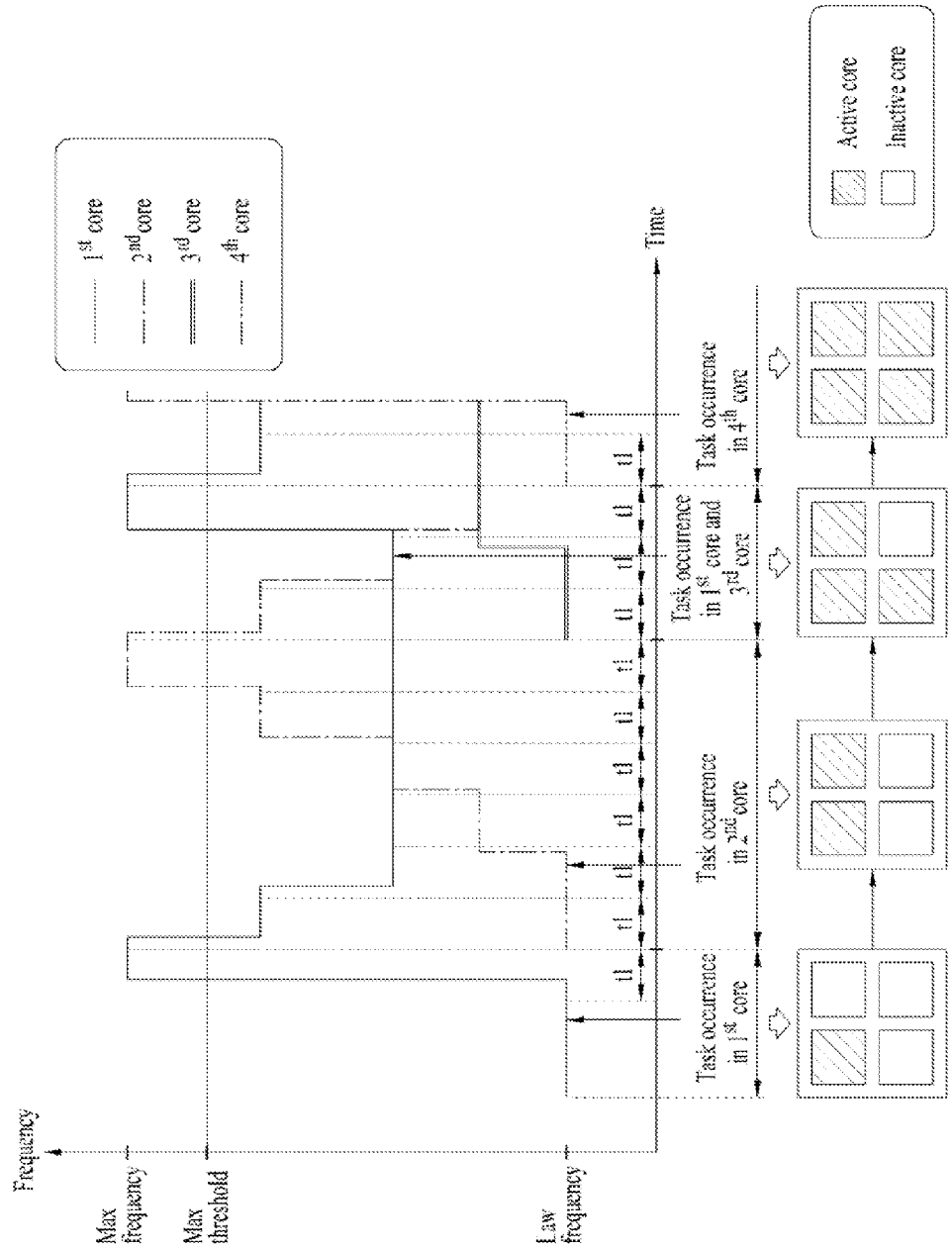
FIG. 13 is a diagram for one example of frequency variations of cores.

FIG. 12 is a flowchart for operation of a frequency adjuster 220 according to the present invention. FIG. 13 is a diagram for one example of frequency variations of cores. In an early stage of the example shown in FIG. 12 or FIG. 13, assume that a prescribed core of a quad-core is active. Yet, it may be unnecessary to active a single core only. For instance, at least two cores of the quad-core can be active.

Referring to FIG. 12 and FIG. 13, the frequency adjuster 220 operates a frequency of a core active in a normal mode (i.e., a case that there is no task to be processed by CPU) at a preset low frequency [S1201]. The frequency adjuster 220 periodically checks a work-load of the active core and may be then able to determine whether a task to be processed by the active core is generated [S1202]. If the task to be processed by the active core is generated, the frequency adjuster 220 may be able to adjust a frequency of each core in accordance with a frequency profile applied to the corresponding core [S1203]. For instance, the frequency adjuster 220 may raise the frequency of the core having the on-demand profile applied thereto up to a maximum frequency (Max Frequency) [S1204]. For another instance, the frequency adjuster 220 may gradually raise the frequency of the core having the conservative profile applied thereto toward the maximum frequency (Max Frequency) [S1205]. Thereafter, the frequency adjuster 220 periodically checks the work-load of the active core and may be then able to raise or lower the frequency of the corresponding core.

In doing so, referring to FIG. 13, the frequency adjuster 220 may control the on-demand profile to be applied to the first core (i.e., the initially active core in the early stage) and may control the conservative profile to be applied to the second core (i.e., the core activated after activation of the first core). In particular, the frequency adjuster 220 controls the on-demand profile to be applied to the first core and also controls the conservative profile, which is different from the profile applied to the first core, to be applied to the second core. If the on-demand profile is applied to the first core, it may be able to secure performance of the mobile terminal over a predetermined level. As mentioned in the foregoing description with reference to FIG. 3, in case of the conservative profile, since the frequency of the active core needs to be raised step by step, the conservative profile is not suitable for a task that has to output a result quickly. Hence, by applying the on-demand profile to the first core, the performance of the mobile terminal can be secured to some extent. Yet, in case of the on-demand profile, since the frequency of the active core is set to a maximum frequency as soon as the task occurs, if the N is set to 1, it may trigger the activation of the second core immediately. Yet, when the N is set to 2 or greater, the second core will be activated only if the task is maintained after elapse of a prescribed delay.

If the conservative profile is applied to the second core, it may be able to prevent the indiscreet activation of the third core. If the on-demand profile is applied to the second core like the first core, a frequency of the second core is raised to a maximum frequency immediately as soon as a task supposed to be processed by the second core occurs. Hence, the frequency of the second core exceeds the maximum threshold determined by the multicore adjuster 230 as well. In this case, the third core is activated indiscreetly as soon as the second core is activated. Hence, since the third core is activated despite that a work-load is not enough to activate the third core, an unnecessary power is consumed.

On the other hand, if the conservative profile is applied to the second core, since the frequency of the second core is gradually raised toward the maximum frequency in response to a work-load, the frequency of the second core may not directly exceed the maximum threshold determined by the multicore adjuster 230. In this case, the third core is activated only if the work-load of the second core is considerable. Therefore, it is advantageous in that the third core is usable only if the activation of the third core is necessary.

In particular, by applying the on-demand profile to the first core, the enhancement of the performance of the mobile terminal is secured. And, the third core and the fourth core are prevented from being indiscreetly activated in a manner of applying the conservative profile to the second core and the like.

Moreover, by applying the conservative profile to the third core, it may be able to prevent the indiscreet activation of the fourth core as well.

Yet, it may be unnecessary to apply the conservative profile to the fourth core (i.e., the core last activated) [cf. FIG. 13]. In particular, the fourth core is the last core of the quad-core. After the fourth core has been activated, there are no more cores to be activated. Even if the frequency of the fourth core exceeds the maximum threshold of the multicore adjuster 230 instantly, since there are no more cores to be activated, a power consumed for the core activation does not exist. Therefore, even if the on-demand profile is applied to the fourth core (i.e, the core which is activated lastly), it may be able to control unnecessary core activation not to be triggered. In particular, in order to prevent an inactive core from being indiscreetly activated, the present invention controls heterogeneous frequency profiles to be applied in order of core activation.

Yet, referring to FIG. 13, if the on-demand profile is applied to the first core, a chain of activations may occur in the third core and the fourth core as well as in the second core.

Figure 14:
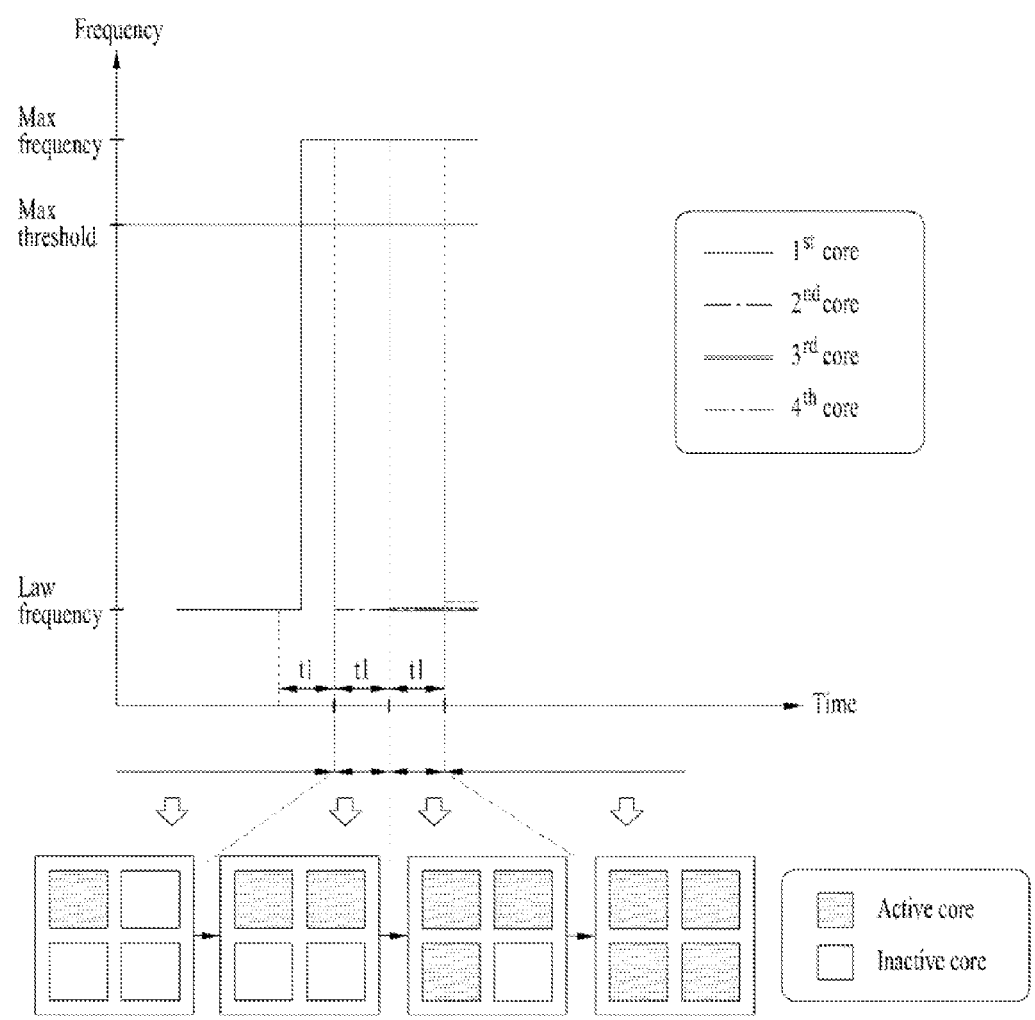
FIG. 14 is a diagram for one example of a situation in case that a chain of frequency activations of second to forth cores occurs.

FIG. 14 is a diagram for one example of a situation in case that a chain of frequency activations of second to fourth cores occurs.

Referring to FIG. 14, in case that the first core is operated at a maximum frequency for a long term, it may trigger a chain of activations of the third and fourth cores as well as the second core. To prevent this, the conservative profile may be applied to the first core instead of the on-demand profile.

According to the aforementioned embodiments, the maximum and minimum thresholds determined by the multicore adjuster 230 may indicate specific frequency values, respectively, by which the present invention may be non-limited. For instance, each of the maximum and minimum thresholds may be determined by a ratio of a maximum frequency to a minimum frequency or a ratio for a range between the maximum frequency and the minimum frequency. In particular, the maximum threshold is set to 90% of the maximum frequency or higher. The minimum threshold is set to 110% of the minimum frequency or 50% of the maximum frequency or lower.

According to the aforementioned embodiments, the maximum/minimum frequency (Max/Low Frequency) may mean the maximum/minimum value in accordance with CPU specifications or may mean the maximum/minimum frequency determined by the frequency adjuster 220.

For instance, if the specifications of each CPU core include minimum 238 MHz and maximum 988 MHz, the maximum frequency and the minimum frequency in FIG. 6 and FIG. 7 may mean 988 MHz and 238 MHz, respectively. For another instance, although the specifications of each CPU core include minimum 238 MHz and maximum 988 MHz, if the frequency adjuster 220 sets the minimum frequency and the maximum frequency to 384 MHz and 786 MHz, respectively, 786 MHz and 384 MHz can be applied to the maximum frequency and the minim frequency, respectively.

According to one embodiment of the present invention, in case that the frequency adjuster 220 determines a maximum frequency and a minimum frequency, each of the maximum and minimum frequencies may be changeable in response to a situation of a mobile terminal. For instance, the maximum frequency or the minimum frequency may be variable in response to a remaining power level of a power supply unit. By adjusting the maximum and/or minimum frequency of each core, a power amount consumed by the corresponding core can be adjusted and a usable time of the mobile terminal can be extended.

Figure 15:
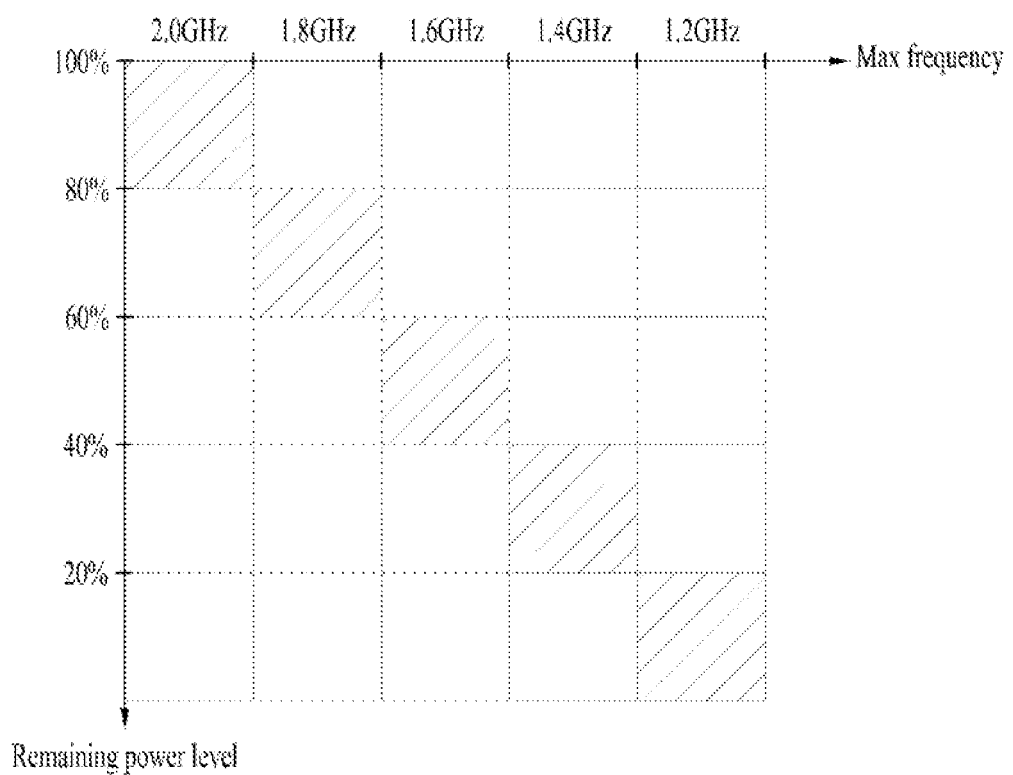
FIG. 15 is a graph for one example of a process for changing a maximum frequency determined by a frequency adjuster in response to a remaining power level of a power supply unit.

FIG. 15 is a graph for one example of a process for changing a maximum frequency determined by a frequency adjuster in response to a remaining power level of a power supply unit. In FIG. 15, X-axis indicates a maximum frequency determined by the frequency adjuster 220 and Y-axis indicates a remaining power level of the power supply unit.

Referring to FIG. 15, a maximum frequency operable in a core may be lowered in proportion to a remaining power level of the power supply unit. This is to further extend a usable time of the mobile terminal by reducing power consumption of the core in a manner of lowering the maximum frequency. In the example shown in FIG. 15, the maximum frequency is adjusted only. Yet, it is a matter of course that a minimum frequency can be adjusted as well as the maximum frequency.

Moreover, in the examples shown in FIG. 12 and FIG. 13, the on-demand profile is applied to the first core, the conservative profile is applied to the second core, the conservative profile is applied to the third core, and the on-demand profile is applied to the fourth core. Yet, the profiles applied to the cores need not to be operated by being fixed thereto.

For instance, the frequency adjuster 220 may be able to variably adjust the number of cores having the on-demand profile applied thereto and the number of cores having the conservative profile applied thereto in response to a remaining power level of the power supply unit.

Figure 16:
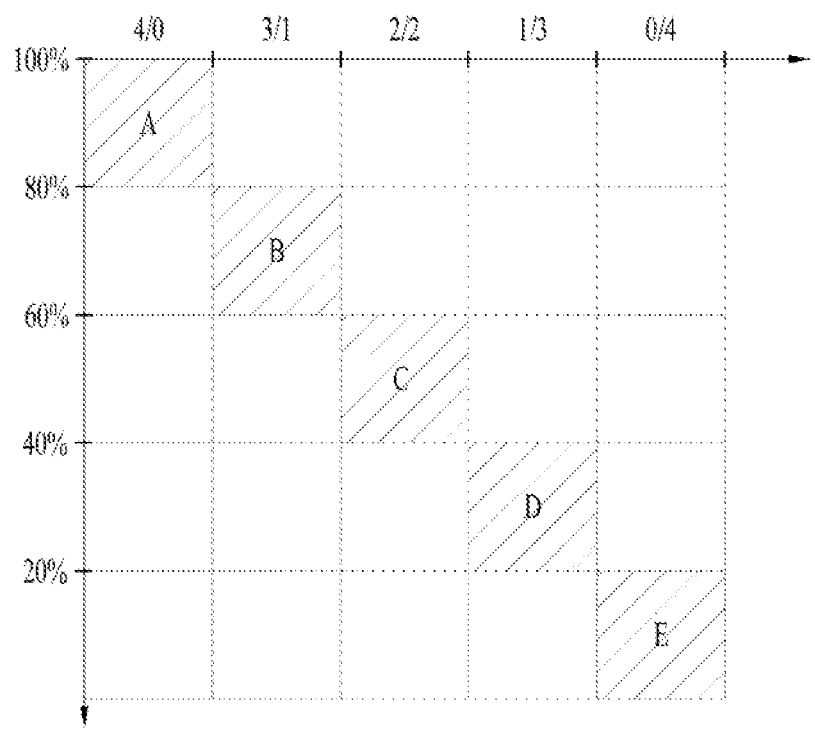
FIG. 16 is a graph for one example of a process for changing a frequency profile of a core in response to a remaining power level of a power supply unit.

FIG. 16 is a graph for one example of a process for changing a frequency profile of a core in response to a remaining power level of a power supply unit. In FIG. 16, Y-axis indicates a remaining power level of the power supply unit and Y-axis indicates the number of cores, to which the on-demand profile will be applied, and the number of cores, to which the conservative profile will be applied. In the item written in form of 'a/b' on the X-axis, 'a' may indicate the number of cores to which the on-demand profile will be applied and 'b' may indicate the number of cores to which the conservative profile will be applied.

Referring to FIG. 16, in case that a remaining power level of the power supply unit is sufficient (i.e., a region A shown in FIG. 16), the on-demand profile is applied to all the 4 cores. If the remaining power level is lowered, the number of the cores, to which the conservative profile is applied, can be set to increase. In case of applying the setting of a region B shown in FIG. 16, it may be able to control the conservative profile to be applied to one of the 4 cores. For instance, the conservative profile is set to be applied to one of the second to fourth cores except the first core or may be set to be applied to the first to third cores except for the fourth core. Preferably, the conservative profile may be applied to the second or third core to prevent the indiscreet activation of the inactive core, by which the present example may be non-limited. If the conservative profile is applied to the second core, it may be able to prevent the third core from being indiscreetly activated. If the conservative profile is applied to the third core, it may be able to prevent the fourth core from being indiscreetly activated.

In case of applying the setting of a region C shown in FIG. 16, the on-demand profile is applied to two cores and the conservative profile is applied to the remaining 2 cores. For instance, the settings shown in FIG. 13 may be applicable. In particular, the on-demand profile is applied to the first core and the fourth core and the conservative profile is applied to the second core and the third core. For another instance, the on-demand profile is applied to the first core and the second core and the conservative profile is applied to the third core and the fourth core.

In case of applying the settings of the region C shown in FIG. 16, the on-demand profile is applied to the first core and the conservative profile may be applied to the second to fourth cores. By applying not the on-demand profile but the conservative profile to the fourth core, the power consumption can be reduced. On the other hand, the conservative profile is applied to the first to third cores, and the on-demand profile may be applied to the fourth core. In this case, even if processing capability of the first core is lowered, it may control the power consumption to be reduced by preventing the second core, the third core and the fourth core from being indiscreetly activated after the activation of the first core.

As the remaining power level of the power supply unit is further reduced, if the settings of a region D is applied, the conservative profile can be applied to all the 4 cores. Therefore, the inactive cores can be prevented from being indiscreetly activated. And, a usable time of the mobile terminal can be extended using the conservative profile having a power need smaller than that of the on-demand profile.

The example shown in FIG. 15 and the example shown in FIG. 16 may not be separately implemented. For instance, the examples shown in FIG. 15 and FIG. 16 may be implemented together by being combined with each other. The example of implementing the combination of the examples shown in FIG. 15 and FIG. 16 is described in detail with reference to FIG. 17 as follows.

Figure 17:
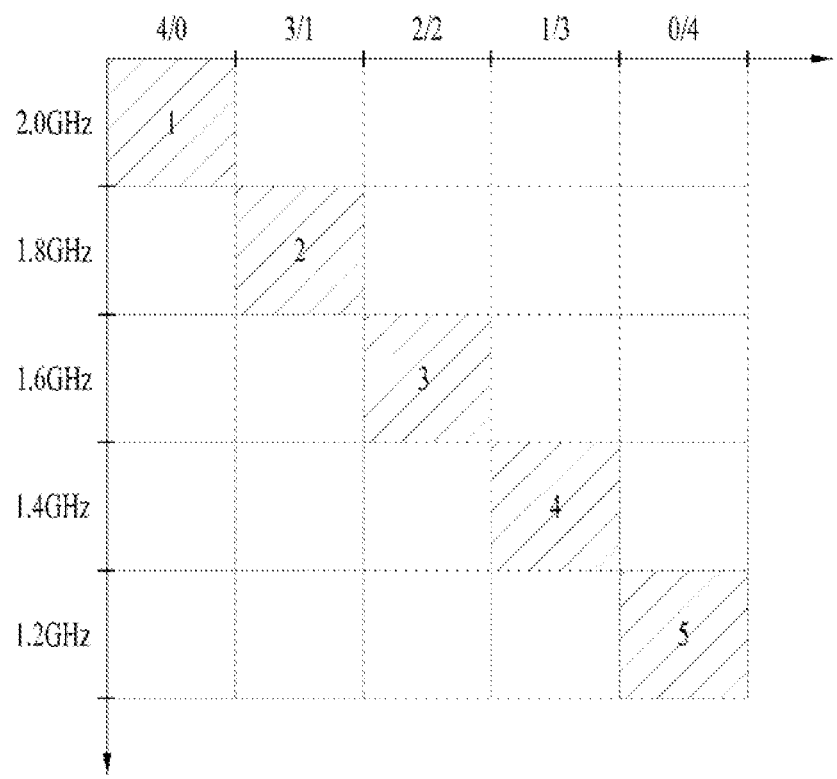
FIG. 17 is a graph for one example of a process for changing a maximum frequency of each core and a frequency profile applied to the corresponding core in response to a remaining power level of a power supply unit.

FIG. 17 is a graph for one example of a process for changing a maximum frequency of each core and a frequency profile applied to the corresponding core in response to a remaining power level of a power supply unit. In FIG. 17, Y-axis may indicate the maximum frequency of a core. And, X-axis may indicate the number of on-demand profile applied cores and the number of conservative profile applied cores. The numerals 1 to 5 represented on the graph indicate the remaining power levels of the power supply unit shown in FIG. 10. For instance, if the numeral gets closer to 1, the remaining power level becomes higher. If the numeral gets closer to 5, the remaining power level becomes lower.

Referring to FIG. 17, as the remaining power level of the power supply unit is lowered, the frequency adjuster 220 may control the maximum frequency of each core to be lowered and control the number of the conservative profile applied cores to increase. By lowering the maximum frequency, power consumption of each core can be reduced. By adopting the conservative profile which has a power consumption smaller than that of the on-demand profile, the power consumption can be reduced and the indiscreet core activation can be prevented. Therefore, it may be able to expect an additional power consumption saving effect.

FIGS. 9 to 11 show the examples of modifying the settings of the multicore adjuster 230 in response to the remaining power level of the power supply unit. FIGS. 15 to 17 show the examples of modifying the settings of the frequency adjuster 220 in response to the remaining power level of the power supply unit. It may be unnecessary for the aforementioned embodiments, which are described with reference to the accompanying drawings, to be individually implemented. For instance, at least two of the aforementioned embodiments may be implemented in combination with each other.

The embodiments described with reference to the frequency adjuster 220 and the multicore adjuster 230 may be available in a manner of being configured into a single CPU. The frequency adjuster 220 adjusts a frequency of a core and a frequency profile of the core, thereby reducing power consumption of the core. The multicore adjuster 230 restricts the maximum number of cores, which can be activated, or controls an inactive core not to be directly activated, thereby reducing a power consumed by the core. In particular, the present invention strictly sets up a condition for activating an inactive core, thereby controlling a power consumed for activation of a core to be reduced.

Yet, in the embodiments shown in FIGS. 9 to 11 and FIGS. 15 to 17, on a specific condition of executing a heavy application program or the like, it may not be preferable to decrease the number of active cores in order to reduce power consumption. For instance, if it takes 20 seconds to process a task, which can be processed in 5 seconds using two cores, using a single core, it may degrade performance of a mobile terminal. And, it may cause a problem that a case of using the single core may consume a power more than that of a case of using two cores. In this case, if the maximum number of active cores is increased or the on-demand profile is applied instead of the conservative profile, it may consume a less power. Thus, if a specific condition occurs, the multicore adjuster 230 or the frequency adjuster 220 controls the maximum number of the active cores to be increased, controls the N value to be decreased, or controls the frequency profile to be changed into the on-demand profile, rather than performs the settings in accordance with the remaining power level of the power supply unit.

For instance, in the example shown in FIG. 11, it may be able to control a task to be processed in a manner of returning to a region #3 temporarily (e.g., for a prescribed time, while an occurring task is entirely processed, etc.) in case that a frequency of a core exceeds a second threshold different from a maximum threshold determined by the multicore adjuster 230 for a second prescribed time (i.e., M times, where M is a natural number) in the course of operation in an environment #5. For instance, if one of active cores is operated over 5 seconds at a frequency amounting to at least 95% of a maximum frequency, the multicore adjuster 230 determines it as processing over-capability and then controls more cores to be activated.

Likewise, in the example shown in FIG. 17, while all cores are operated by having the conservative profile applied thereto (i.e., in the course of operation in the environment #5), if a frequency of one core exceeds a second maximum threshold determined by the multicore adjuster 230 for a prescribed time (i.e., M times), the frequency adjuster 220 receives a command from the multicore adjuster 230 and then applies the on-demand profile to two cores temporarily, thereby enhancing a task processing speed.

Yet, since the above-mentioned cases are the measures contradictory to the settings in accordance with the remaining power level of the power supply unit, it may be preferable to set up the conditions strictly. Preferably, the M may be set to a natural number greater than the N and the second threshold may be set greater than the maximum threshold, by which the present invention may be non-limited.

In case that a frequency of at least one of the active cores is lowered smaller than a minimum threshold determined by the multicore adjuster 230, the multicore adjuster 230 according to the present invention may be able to control the corresponding core to be deactivated. In doing so, the multicore adjuster 230 may be able to keep the core, which is set to default among 4 cores, maintain the active state instead of being deactivated. For instance, if the first core is set to a default core, the multicore adjuster 230 may be able to control the first core not to be deactivated even if a frequency of the first core is lowered smaller than the minimum threshold. In this case, a random one of the second to fourth cores in the active state is deactivated. Moreover, a task performed by the inactive core is transferred to the first core (or distributed to another active core) and continues to be performed. If the default core is designated and operated, it may be able to secure the stability of the mobile terminal by keeping at least one of the 4 cores continuously despite that the 4 cores are activated/deactivated at the same bundle. It may be unnecessary to designate a single core only. For instance, at least two cores can be designated as defaults.

In case that a prescribed one of the 4 cores is deactivated, the frequency adjuster 220 applies the on-demand profile to the first core and may control the conservative profile to be applied to the rest of the cores. For instance, even if the conservative profile applied third core among the aforementioned 4 cores is deactivated, if the conservative profile is applied to the fourth core, one core of the on-demand profile and two cores of the conservative profile can be configured. Likewise, if two cores are deactivated, the frequency adjuster 220 controls the on-demand profile to be applied to the first core and also controls the conservative profile to be applied to the remaining core. In particular, no matter what the inactive core is, the frequency profile of the active core can be controlled to become equal to the previously designated number. The frequency adjuster 220 may be provided with information on whether to adjust a frequency profile under the control of the multicore adjuster 230.

In the above described embodiments, a frequency profile to be applied to a core, the maximum number of activation available cores, and the N value determined by the multicore adjuster 230 are changeable in accordance with the remaining power level of the power supply unit. Yet, it is not mandatory for the factors (e.g., the frequency profile, the maximum core number, the N value, etc.) to be automatically adjusted in accordance with the remaining power level of the power supply unit. For instance, the above-mentioned factors can be changed by user settings.

In the following description, a process for a user to adjust the settings of a multicore adjuster and/or a frequency adjuster is explained in detail with reference to one example of adjusting the maximum number of the activation available cores among the above-mentioned factors by user settings.

Figure 18:
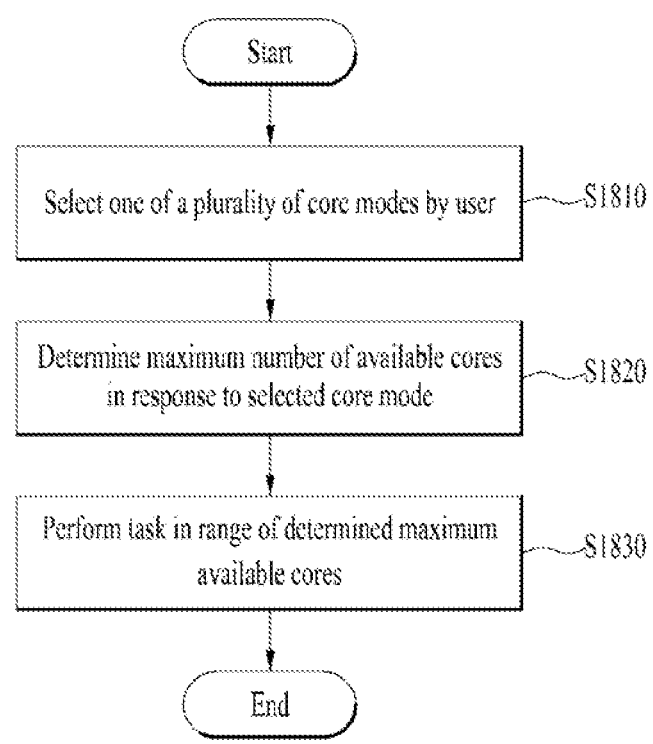
FIG. 18 is a flowchart for one example of performing a task within a range of a maximum number of available cores corresponding to a code mode selected from a plurality of core modes according to the present invention.

FIG. 18 is a flowchart for one example of performing a task within a range of a maximum number of available cores corresponding to a code mode selected from a plurality of core modes according to the present invention.

Referring to FIG. 18, a user may be able to select a prescribed one of a plurality of core modes through a key button manipulation or a menu manipulation [S1810]. In this case, a plurality of the core modes may be set in various ways to correspond to the number of cores applicable to a mobile terminal. For instance, in case that 6 cores are applied to the mobile terminal, a first core mode capable of using maximum 6 cores, a second core mode capable of using maximum 5 cores, a third core mode capable of using maximum 4 cores, a fourth core mode capable of using maximum 3 cores, a fifth core mode capable of using maximum 2 cores and a sixth core mode capable of using maximum 1 core may be applicable.

Moreover, it may be unnecessary for the number of the core modes to be determined to exactly correspond to the number of the applied cores. Instead, a smaller number of core modes may be available. For instance, in case that 4 cores are applied, 3 core modes may be applicable despite that maximum 4 core modes are available. In particular, a first core mode capable of using maximum 4 cores, a secondcore mode capable of using maximum 2 cores and a third core mode capable of using maximum 1 core may be applicable.

In a quad-core that uses 4 cores, assume that a quad-core mode capable of activating maximum 4 cores, a dual-core mode capable of activating maximum 2 cores and a power saving mode capable of activating maximum 1 core are applicable.

Figure 19:
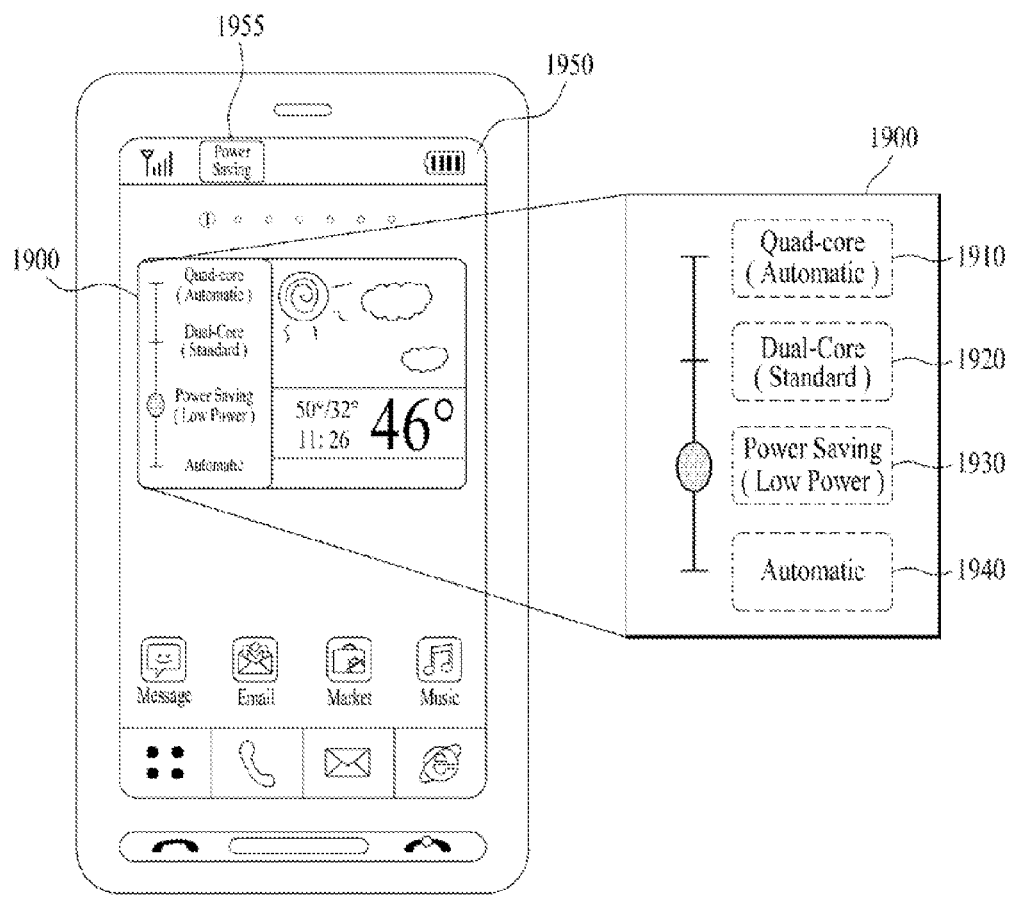
FIG. 19 is a diagram for one example of displaying information for selecting a prescribed one of a plurality of core modes according to the present invention.

FIG. 19 is a diagram for one example of displaying information for selecting a prescribed one of a plurality of core modes according to the present invention.

Referring to FIG. 19, a menu 1900 for selecting a quad-core mode 1910, a dual-core mode 1920 and a power saving mode 1930 is displayed on a prescribed region of the display unit. In particular, a user may be able to select a quad-core point, a dual-core point or a power saving point displayed at a prescribed position of a bar included in a menu 1900. And, the controller 180 may be able to control a core mode, which matches the selected point, to be set in the mobile terminal. Moreover, the controller 180 may be able to control a prescribed visual effect to be further displayed to information a user of the point selected from the quad-core point, the dual-core point and the power saving point. The displayed visual effect may include at least one of a color change visual effect, a resolution change visual effect, a transparency change visual effect and the like. In the example shown in FIG. 19, if an automatic mode 1940 is selected separately from a plurality of the core modes, the controller 180 may be able to automatically adjust the maximum number of activation available cores and a maximum frequency of each of the cores in accordance with a remaining power level of the power supply unit.

The information on the core mode of the mobile terminal may be displayed as an indicator 1955 provided to a status bar 1950, which shows the status of the mobile terminal, displayed on the display unit of the mobile terminal. Yet, it may be unnecessary for the indicator 1955 indicating the set core mode to be displayed all the time. For instance, the indicator 1955 may be optionally displayable in accordance with user's necessity.

The menu 1900 is displayed on the display unit 151 to enable a prescribed one of a plurality the core modes to be selected. Yet, it may be unnecessary for the menu 1900 to be displayed on the display unit 151.

Figure 20:
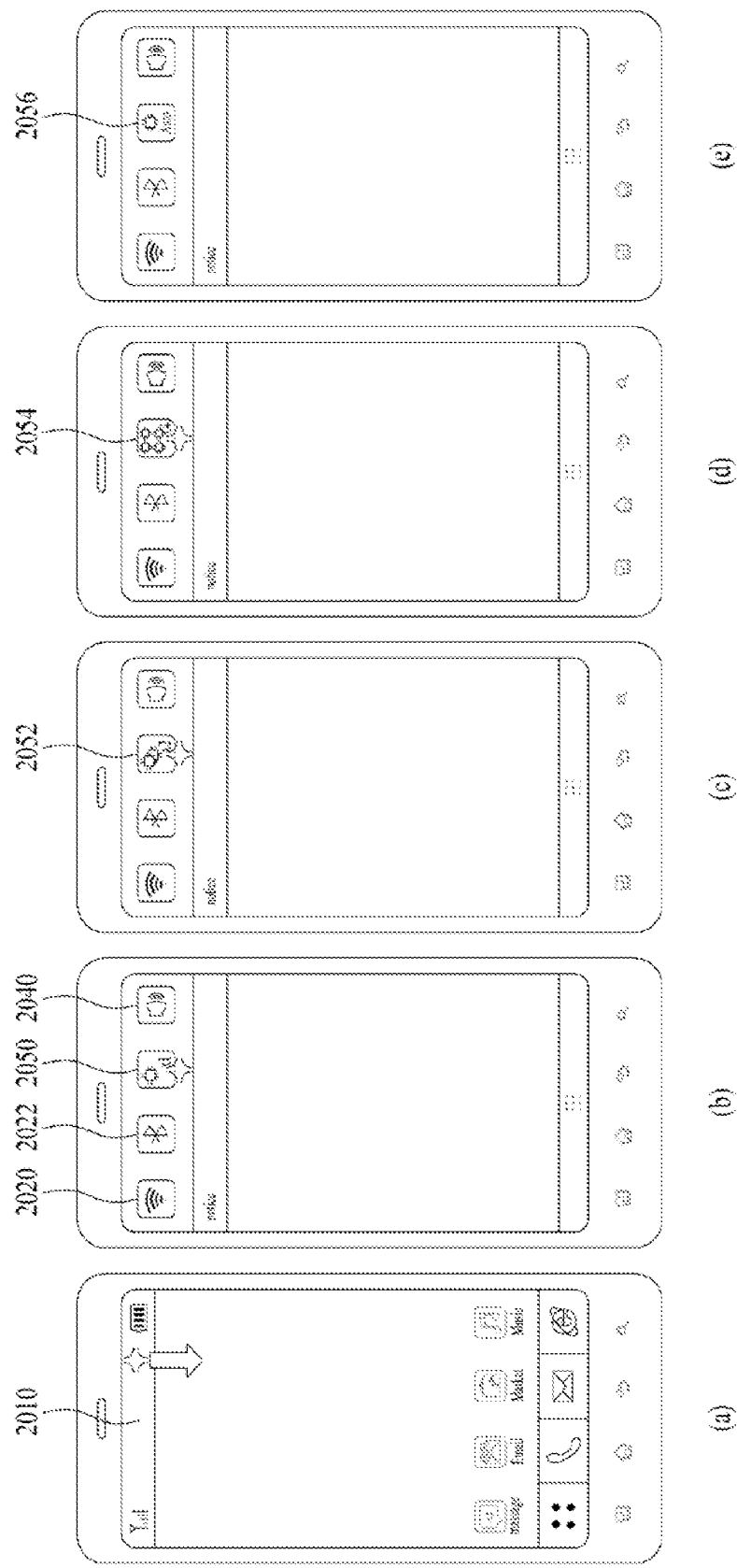
FIG. 20 is a diagram for another example of selecting a prescribed core mode from a plurality of core modes according to the present invention.

FIG. 20 is a diagram for another example of selecting a prescribed core mode from a plurality of core modes according to the present invention.

Referring to FIG. 20, if a user scrolls a status bar 2010 [FIG. 20 (*a*)], a setting screen may be displayed [FIG. 20 (*b*)]. The user may be able to set On/Off of the wireless internet mode, the short range communication module and the like in the setting screen shown in FIG. 20 (*b*) for selection. In FIG. 20, the settings can be performed in a manner of touching a Wi-Fi icon 2020 or a Bluetooth icon 2022, for example. And, the user may be able to determine whether to set the mobile terminal to an audio outputtable mode or a vibration mode. In the example shown in FIG. 20, the settings can be performed by touching a speaker icon 2040. Moreover, a prescribed core mode can be controlled to be selected from a plurality of core modes. In particular, the user touches a core mode button 2050 shown in FIG. 20 (*b*), thereby controlling a core mode of the mobile terminal to be changed. In the example shown in FIG. 20 (*b*), a button indicating a single core mode is displayed on the core mode button 2050. If the core mode button 2050 in the screen shown in FIG. 20 (*b*) is touched one more time, the controller changes the core mode into a dual-core mode and may control an icon indicating the dual-core mode to be displayed through the core mode button 2052 [FIG. 20 (*c*)]. If the core mode button 2052 in the screen shown in FIG. 20 (*c*) is touched again, the controller changes the core mode into a quad-core mode and may control an icon indicating the quad-core mode to be displayed through the core mode button 2054 [FIG. 20 (*d*)]. Thereafter, if the core mode button 2054 is touched again, the controller controls an auto mode, in which the settings of the mobile terminal can be automatically adjusted in accordance with a remaining power level of the power supply unit, to be automatically entered and may control an icon to be displayed through the core mode button 2056 to indicate that the auto mode has been entered. In particular, it may be able to select at least one core mode from a plurality of the core modes without displaying such a menu 1900 screen as shown in FIG. 19. Yet, FIG. 19 and FIG. 20 show the examples of selecting at least one core mode from a plurality of the core modes only. And, it is a matter of course that a screen can be configured different from those shown in the drawings.

The assumption of the 4 cores supported by the mobile terminal, the quad-core mode, the dual-core mode and the power saving mode are just examples to which the present invention is applicable. And, it is apparent to those skilled in the art that the technical ideas of the present invention are applicable to embodiments of other types.

Referring now to FIG. 18, if a prescribed core mode is selected from a plurality of the core modes, the multicore adjuster 230 may be able to determine the maximum number of the activation available cores in response to the selected core mode [S1820].

As mentioned in the foregoing description, in case that the quad-core mode is selected, maximum 4 cores may be activated. In case that the dual-core mode is selected, maximum 2 cores may be activated. Moreover, in case that the power saving mode is selected, maximum 1 core is determined to be activated.

Thereafter, the multicore adjuster 230 controls a task to be processed in a range of the maximum number of the activation available cores [S1830].

For instance, if the quad-core mode is selected, a prescribed task can be processed using 1 to 4 cores. Moreover, if the power saving mode is selected, a prescribed task can be processed using one core only.

Figure 21:
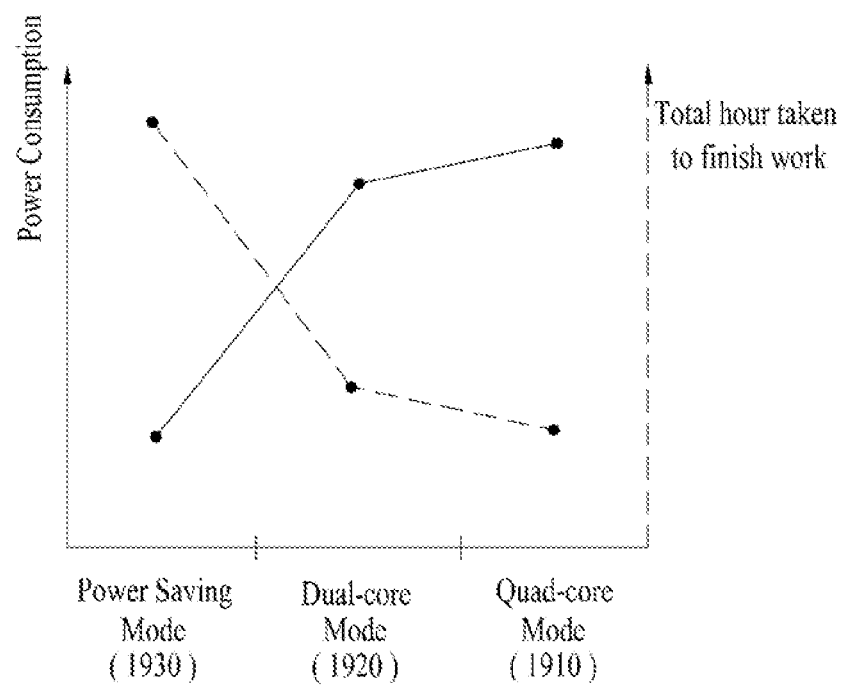
FIG. 21 is a graph for one example of effects in case of applying the core modes shown in FIGS. 18 to 20.

FIG. 21 is a graph for one example of effects in case of applying the core modes shown in FIGS. 18 to 20.

Referring to FIG. 21, in a quad-core mode 1910, 4 cores can be simultaneously activated. Hence, the quad-core mode is advantageous in having the highest processing speed but is disadvantageous in having the largest power consumption.

In a dual-core mode, 1 or 2 cores can be activated. Hence, the dual-core mode 1920 secures a processing speed on a predetermined level lower than that of the quad-core mode 1910. And, the dual-core mode 1920 is advantageous in having power consumption smaller than that of the quad-core mode 1910.

In a power saving mode 1930, one core can be activated only. So, the power saving mode 1930 is unable to avoid the problem of the performance degradation of the mobile terminal. Yet, the power saving mode has a consumed power smaller than those of other modes, thereby enabling the mobile terminal to be used for a long term.

Therefore, a user is able to select a core mode necessary for a current situation from the quad-core mode, the dual-core mode and the power saving mode.

According to the embodiments described with reference to FIGS. 18 to 21, the maximum number of the activation available cores, which is determined by the multicore adjuster, can be manually adjusted by a user's setting. And, various settings can be adjusted manually. For instance, the N value determined by the multicore adjuster can be manually adjusted. The settings of the maximum frequency, the frequency profile and the like, which are determined by the frequency adjuster, can be manually adjusted.

For instance, in each of the core modes shown in FIGS. 18 to 21, the maximum frequency determined by the frequency profile can be adjusted. For instance, if the quad-core mode or the dual-core mode is selected, the maximum frequency may be set to 1.5 GHz. If the power saving mode is selected, the maximum frequency may be set to 1.2 GHz.

One example of adjusting the maximum number of cores activated in each core mode and one example of adjusting a maximum frequency of each core are described in detail with reference to FIG. 22 and FIG. 23 as follows.

Figure 22:
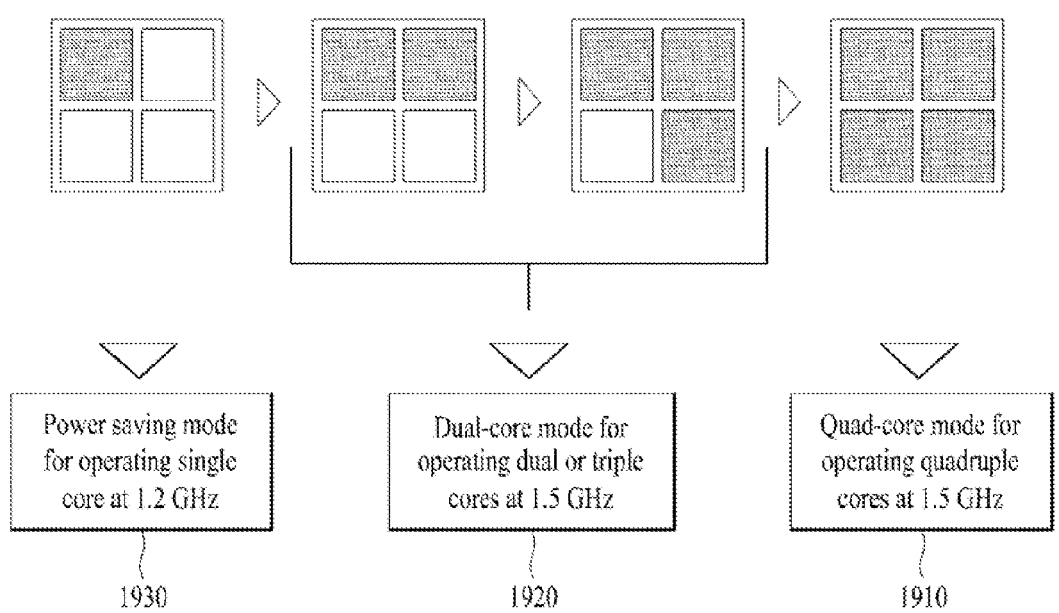
FIG. 22 is a diagram for one detailed example of applying a plurality of core modes in the presence of 4 cores according to the present invention.

FIG. 22 is a diagram for one detailed example of applying a plurality of core modes in the presence of 4 cores according to the present invention.

Referring to FIG. 22, a quad-core mode is preferably applied to a case that extreme performance is required for a heady work-load. In case that a code mode is set to the quad-core mode, a maximum frequency of 1.5 GHz is applied per core. If necessary, 1 to 4 cores can be activated.

A dual-core mode is a basic setting and is preferably applied to a case that performance and battery having no difficulty in most of everyday life are required. In case that a code mode is set to the dual-core mode, a maximum frequency of 1.5 GHz is applied per core. If necessary, 1 or 2 cores can be activated. Besides, in case that a core mode is set to a triple-core mode, 1 to 3 cores can be activated if necessary [not shown in the drawing].

A power saving mode is preferably applied to a case that a remaining battery level is almost zero. And, a maximum frequency of 1.2 GHz may be applicable. In the power saving mode, 1 core can be activated only for a task processing.

Figure 23:
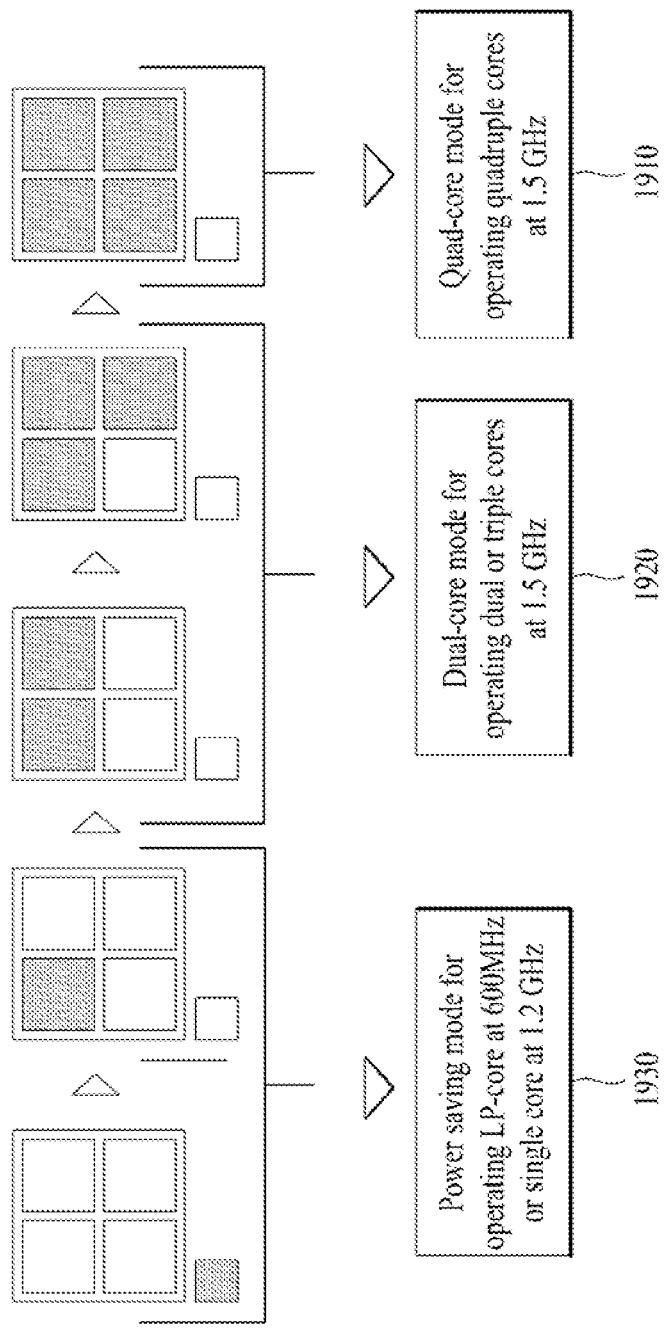
FIG. 23 is a diagram for another detailed example of applying a plurality of core modes in the presence of 4 cores according to the present invention.

FIG. 23 is a diagram for another detailed example of applying a plurality of core modes in the presence of 4 cores according to the present invention.

In FIG. 23, the assumptions applied to FIG. 22 are exactly applied. Yet, FIG. 23 shows one example of a case that a low power core (LP-core) responsible for maintaining minimum functions of a mobile terminal exists in addition to 4 cores (e.g., Tegra3 chipset by nVidia).

In particular, in the power saving mode shown in FIG. 23, the 4 cores are not active but the low power core is applied only. Hence, the mobile terminal can operate on a lower remaining battery level. Yet, the power saving mode shown in FIG. 23 provides a user with performance lower than that of the former power saving mode shown I FIG. 22.

A maximum frequency of 600 MHz may be applicable to a low power core operable in the power saving mode shown in FIG. 23.

Therefore, the technical ideas of the present invention are applicable to the CPU further including the low power core responsible for the minimum function maintenance of the mobile terminal 100 in addition to the 4 cores.

According to the above-described embodiment, for example, the maximum number of the activation available cores determined by the multicore adjuster 230 and the maximum frequency determined by the frequency adjuster 220 can be manually adjusted. Moreover, it is a matter of course that the N determined by the multicore adjuster 230, the number of cores, to which the on-demand/conservative profile will be applied, determined by the frequency adjuster 220 and the like can be manually adjusted by user's settings.

For instance, the quad-core mode shown in FIG. 19 may be set to correspond to the region #1 determined in FIG. 11 and/or FIG. 17. The dual-core mode may be set to correspond to the region #3. And, the power saving mode may be set to the region #5.

Moreover, the mobile terminal according to the present invention may be operated in a power saving mode. In this case, the power saving mode is the measure for intentionally reducing CPU performance to extend a usable time of the mobile terminal.

Figure 24:
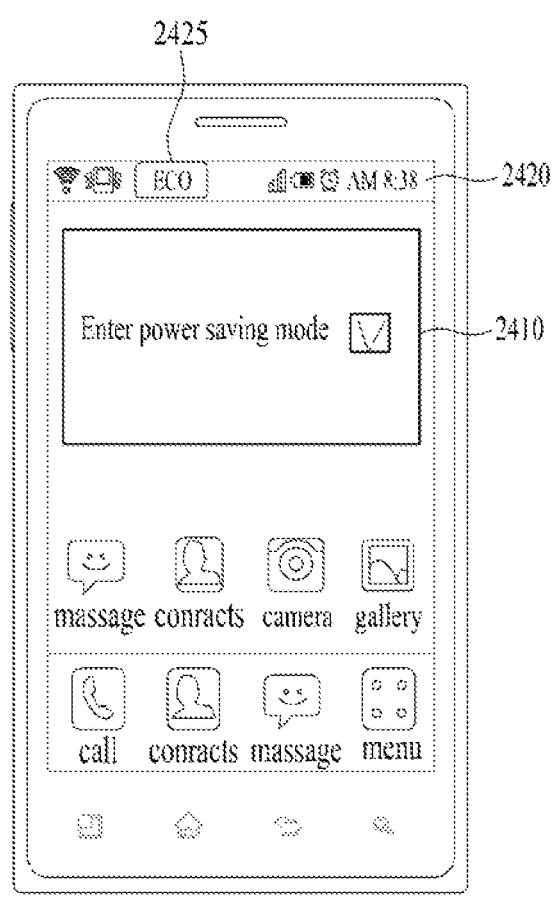
FIG. 24 is a diagram for one example of a screen provided to a user for power mode settings.

FIG. 24 is a diagram for one example of a screen provided to a user for power mode settings.

Referring to FIG. 24, if a user selects a power saving mode from a popup window 2410, the multicore adjuster 230 and/or the frequency adjuster 220 may control performance of each core to be adjusted. For instance, in the example shown in FIG. 11, if the power saving mode is set, the multicore adjuster 230 may control the setting of the region #5 to be applied directly. In the example shown in FIG. 17, if the power saving mode is set, the frequency adjuster 220 may control the setting of the region #5 to be directly applied. In doing so, if the mobile terminal enters the power saving mode, the controller 180 may be able to display an indicator 2425 on a status bar 2420 to indicate that the mobile terminal has entered the power saving mode.

In particular, in the power saving mode, by adjusting at least one of the number of activated cores, the N value for activating cores, the maximum frequency applied to the core and the frequency profile applied to the core in order to reduce power consumption, the usable time of the mobile terminal can be extended.

Once the power saving mode is set, the controller 180 performs other processings required for the power reduction, thereby controlling the power consumption of the mobile terminal to be minimized. For instance, if the power saving mode is entered, the controller 180 automatically decreases the brightness of the display unit and also controls deactivate the wireless internet module, the short range communication module, the position location module and the like, thereby controlling the power consumption to be minimized.

The above-described embodiment is explained as applicable to a multi-core CPU. And, it is a matter of course that the above-described embodiment is applicable to a multi-core GPU (graphic processing unit). In the following description, GPU (graphic processing unit) and a detailed embodiment of the present invention are explained in order.

Recently, 3D graphics are widely introduced to give 3D effects. As various light source effects and texture representing schemes are developed to provide more realistic screens, the CPU has difficulty in processing these jobs alone. Therefore, in order to assist the CPU, a 3D graphic operation dedicated processor, i.e., a GPU (graphic processing unit) has been developed and loaded on a graphic card.

The main roles of the GPU include operation and creation of 2D and 3D graphics and the modern GPU is further provided with various functions. The representatives of the various functions include Pure Video by nVidia, Avivo (advance video in video out) by AMD and the like, which are able to enhance video play quality and video encoding speed. These functions used to be entitled to the CPU only. Yet, as floating point operation capability (mainly used for multimedia processing or scientific computing) of GPU surpasses that of CPU, the capability of the GPU tends to be utilized for general works as well as for the graphic processing.

Thus, doing a universal work using the resources of GPU as well as a graphic work is called 'GPGPU (general purpose computing on graphics processing units)' and may be mainly applicable to such a field as molecular structure analysis, decryption, weather change prediction and the like as well as to video encoding.

As cores of CPU in a chip increase to dual cores, tipple cores, quadruple cores and the like, the number of cores of GPU gradually increases as well. For instance, although OMAP4 by TI has one GPU only (SGX540 of IP by Imagination), OMAP5 is going to be equipped with two GPUs. And, A5 chip by Apple has already used two GPUs. Exynos by Samsung uses 4 small GPUs (Mali-400 by ARM). Tegra3 by nVidia uses 12 smaller GPUs and is planning to use more GPUs.

Therefore, the technical ideas of the present invention mentioned in the foregoing description can be applied to a plurality of GPUs. In particular, the controller 180 may control the number of active CPU cores and the number of active GPUs to be linked to each other.

Although GPU is not running as fast as CPU at 1.2 GHz~1.5 GHz, since the multicore structure of the GPU is basically identical to that of the CPU, operations of the GPU can be controlled in the same manner of the CPU. Therefore, the controller 180 may control the number of the active GPUS to be limited in response to the number of CPU cores.

In case that the present invention is applied to GPU, the frequency adjuster may be able to adjust a frequency of each core by checking a fillrate of the corresponding core.

Accordingly, embodiments of the present invention provide various effects and/or features.

First of all, the present invention reduces unnecessary power consumption of a mobile terminal, thereby extending a usable time of the mobile terminal.

Secondly, the present invention operates a mobile terminal flexibly in response to a remaining power level of a battery.

Thirdly, the present invention increases the number of active cores if necessary only, thereby reducing power consumption generated from unnecessary core activation.

It will be appreciated by those skilled in the art that the present invention can be specified into other form(s) without departing from the spirit or scope of the inventions.

In addition, the above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a plurality of cores;
   a multicore adjuster configured to:
      obtain a frequency of a first active core among the plurality of cores, and
      activate at least one inactive core among the plurality of cores when the frequency of the first active core exceeds a first threshold value for N times consecutively, wherein N is a plural number; and
   a frequency adjuster configured to:

adjust the frequencies of each of the active cores according to workload thereon,
wherein the first threshold value is defined as a specific level of a maximum frequency of the first active core.

2. The mobile terminal of claim 1, wherein N is adjusted according to a number of the active cores.

3. The mobile terminal of claim 2, wherein N is increased proportionally according to the number of the active cores.

4. The mobile terminal of claim 1, further comprising a power supply unit, wherein N is adjusted according to a remaining power level of the power supply unit.

5. The mobile terminal of claim 4, wherein the multicore adjuster is further configured to adjust a maximum number of inactive cores to be activated according to the remaining power level.

6. The mobile terminal of claim 4, wherein the multicore adjuster is further configured to:
decrease N to a predetermined number regardless of the remaining power level when the frequency of the first active core equals or exceeds a second threshold value for M times consecutively, wherein M is a plural number.

7. The mobile terminal of claim 5, wherein the multicore adjuster is further configured to:
increase the maximum number of inactive cores to be activated regardless of the remaining power level when the frequency of the first active core equals or exceeds a second threshold value for M times consecutively, wherein M is a plural number.

8. The mobile terminal of claim 1, wherein the multicore adjuster is further configured to deactivate at least one of the active cores when the frequency of at least one of the active cores is less than a third threshold value.

9. The mobile terminal of claim 8, wherein at least one core among the plurality of the cores is designated as a default core, and the multicore adjuster is further configured to:
does not deactivate the default core even if a frequency of the default core is less than a minimum threshold value.

10. The mobile terminal of claim 1, wherein the workload of first the active core is determined based on a fill-rate of the first active core.

11. The mobile terminal of claim 1, wherein the frequency adjuster is further configured to set a frequency profile of at least one of the plurality of cores to be different from frequency profiles of other cores of the plurality of cores.

12. The mobile terminal of claim 11, wherein the frequency adjuster is further configured to set an on-demand profile to the active core initially activated.

13. The mobile terminal of claim 11, wherein if all of the plurality of cores are activated, the frequency adjuster is further configured to set an on-demand profile to a last activated core.

14. The mobile terminal of claim 13, wherein the frequency adjuster is further configured to set a conservative profile to at least one of the plurality of cores other than the last activated core.

15. The mobile terminal of claim 11, further comprising a power supply unit, wherein the frequency adjuster is further configured to adjust a maximum frequency of the active cores according to a remaining power level of the power supply unit.

16. The mobile terminal of claim 11, further comprising a power supply unit, wherein the frequency adjuster is further configured to adjust a first number of cores, to which an on-demand profile will be applied and a second number of cores, to which a conservative profile will be applied according to a remaining power level of the power supply unit.

17. A method of controlling a mobile terminal, the method comprising:
obtaining a frequency of a first active core among a plurality of cores;
if the frequency of the first active core exceeds a first threshold value for N times consecutively,
activating at least one inactive core among the plurality of cores, wherein N is a plural number; and
adjusting frequencies of each of the active cores according to workload thereon,
wherein the first threshold value is defined as a specific level of a maximum frequency of the first active core.

18. The method of claim 17, wherein N is adjusted according to remaining power level of a power supply unit.

* * * * *